(12) United States Patent
Sekine et al.

(10) Patent No.: US 6,370,330 B2
(45) Date of Patent: *Apr. 9, 2002

(54) IMAGE SHAKE DETECTING DEVICE

(75) Inventors: Masayoshi Sekine; Toshiyuki Nakajima, both of Tokyo; Takashi Kai, Kanagawa-ken; Katsuji Yoshimura, Shizuoka-ken; Masamichi Toyama, Kanagawa-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,741

(22) Filed: Jul. 26, 1999

Related U.S. Application Data

(60) Continuation of application No. 08/954,919, filed on Oct. 21, 1997, now Pat. No. 6,047,134, which is a continuation of application No. 08/708,133, filed on Aug. 30, 1996, now Pat. No. 5,734,933, which is a continuation of application No. 08/321,916, filed on Oct. 12, 1994, now abandoned, which is a division of application No. 08/053,961, filed on Apr. 26, 1993, now Pat. No. 5,386,264, which is a continuation of application No. 07/970,652, filed on Oct. 30, 1992, now abandoned, which is a continuation of application No. 07/621,294, filed on Jan. 23, 1991, now abandoned, which is a division of application No. 07/319,658, filed on Mar. 6, 1989, now Pat. No. 5,012,270.

(30) Foreign Application Priority Data

| Mar. 10, 1988 | (JP) | 63-057670 |
| Apr. 15, 1988 | (JP) | 63-092695 |
| Apr. 15, 1988 | (JP) | 63-092697 |
| May 19, 1988 | (JP) | 63-123625 |
| Oct. 27, 1988 | (JP) | 63-269554 |
| Feb. 6, 1989 | (JP) | 1-027038 |

(51) Int. Cl.[7] .............................................. G03B 17/00

(52) U.S. Cl. .............................................. 396/54

(58) Field of Search .............................. 396/52, 53, 54, 396/153, 55; 382/103, 107, 197, 172; 348/208, 699, 169, 170, 171, 172

(56) References Cited

U.S. PATENT DOCUMENTS

| 4,264,161 | A | * | 4/1981 | Hosoe et al. | 396/153 |
| 4,320,948 | A | * | 3/1982 | Hosoe et al. | 396/153 |
| 4,779,131 | A | * | 10/1988 | Matsumoto et al. | 348/699 |
| 4,780,739 | A | * | 10/1988 | Kawakami et al. | 396/54 |
| 5,012,270 | A | * | 4/1991 | Sekine et al. | 396/54 |
| 5,949,481 | A | | 9/1999 | Sekine et al. | 348/352 |

* cited by examiner

*Primary Examiner*—W. B. Perkey
(74) *Attorney, Agent, or Firm*—Robin, Blecker & Daley

(57) ABSTRACT

An image shake detecting device for detecting a shake of an image on an image sensing plane on the basis of a video signal output from an image sensor includes detection circuits arranged to detect image displacement in a plurality of areas set on the image sensing plane, and a control microcomputer which makes a discrimination, on the basis of information output from these detection circuits, between a movement of a camera and a solo movement of a photographed object. The device thus accurately makes compensation for an image shake by judging the state of the image on the basis of information output from these detection circuits. The image shake detecting device further includes a computing circuit arranged to compute a quantity of an image shake on the basis of a difference in detecting timing of a feature point of the image and a sensitivity control circuit arranged to change the detection sensitivity of the shake detection circuits. Further disclosed is an object tracing device to which the invented image shake detecting device is applied.

20 Claims, 25 Drawing Sheets

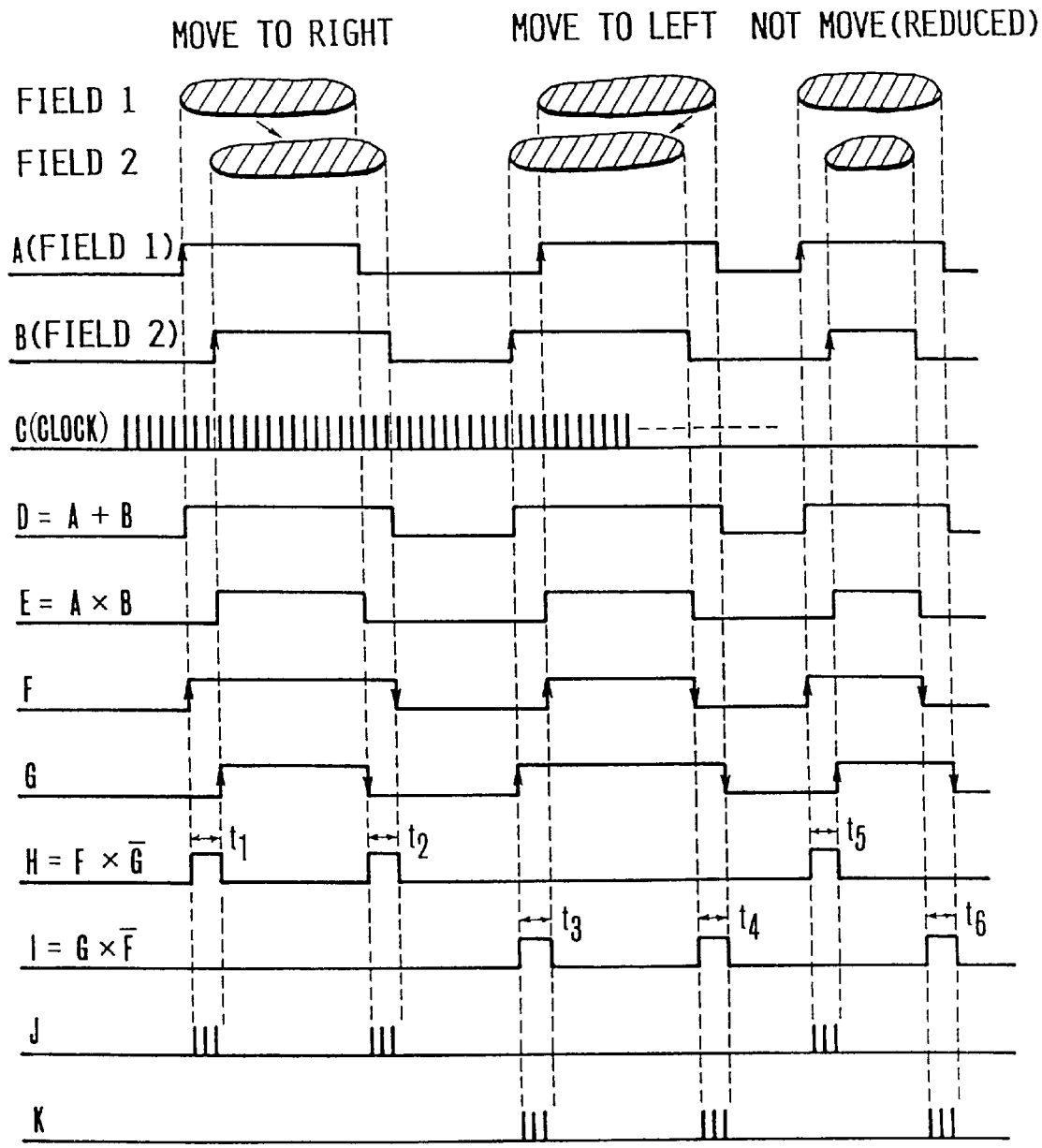

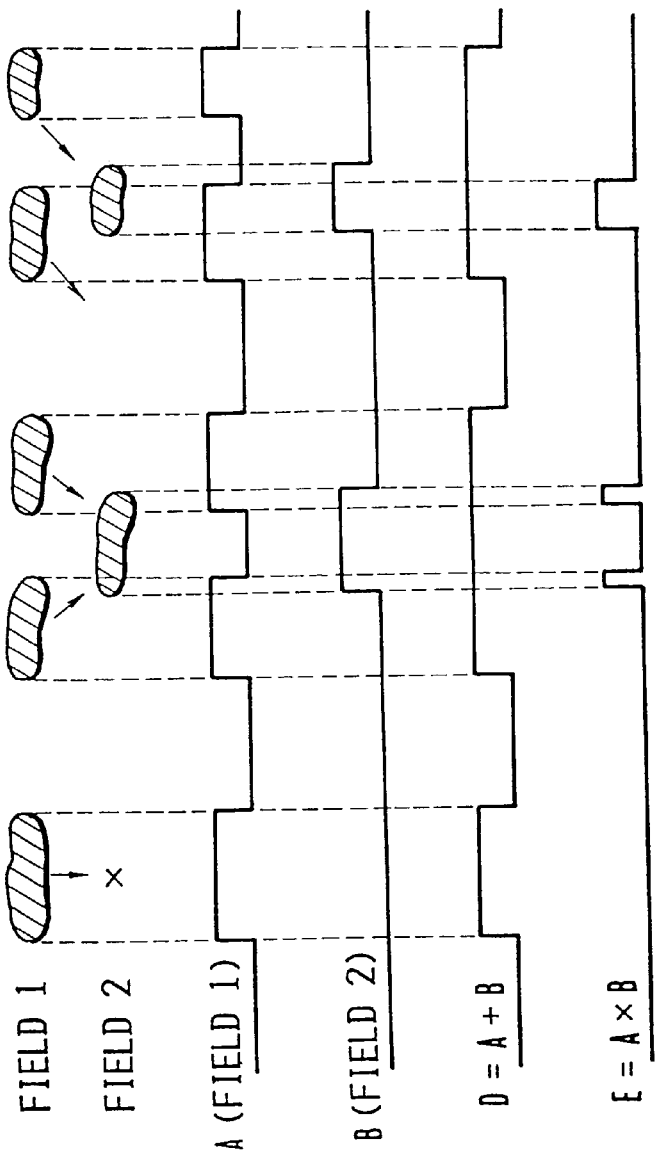

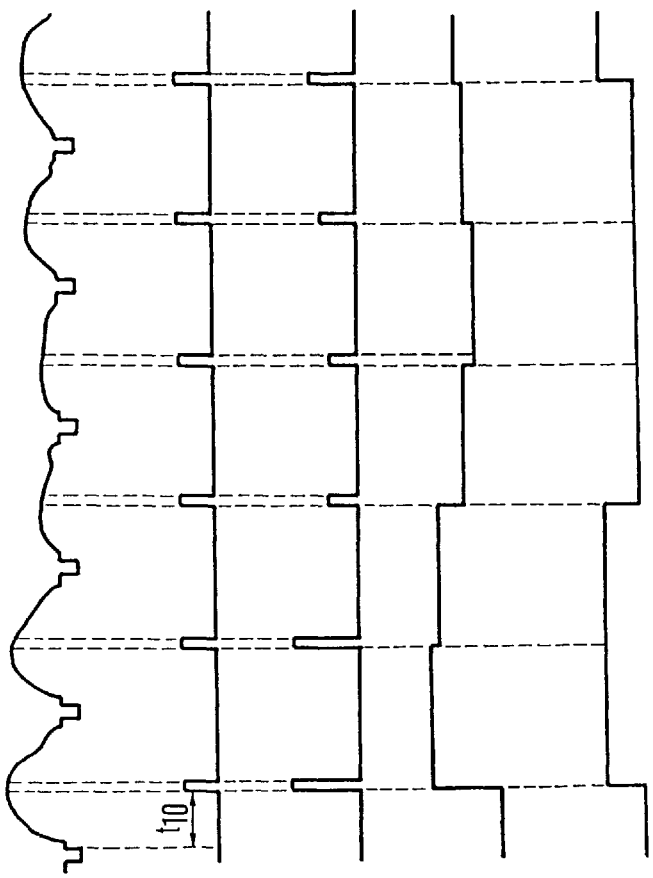
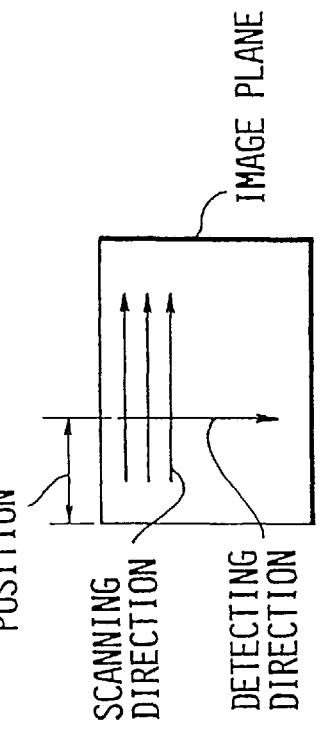
FIG.12(a) VIDEO SIGNAL
FIG.12(b) SAMPLING PULSE
FIG.12(c) SAMPLED DATA
FIG.12(d) HOLDING
FIG.12(e) LEVEL DETERMINATION; BINARY CODING
FIG.12(f) IMAGE PLANE A': NO TRACING
B': CONVENTIONAL TRACING CHARACTERISTIC
C' TRACING CHARACTERISTIC OF THE INVENTION

IMAGE SHAKE DETECTING DEVICE

CROSS-REFERENCE TO RELATED APPLICATIONS

This application is a continuation of Ser. No. 08/954,919, filed Oct. 21, 1997 (U.S. Pat. No. 6,047,134); which is a continuation of Ser. No. 08/708,133, filed Aug. 30, 1996; now U.S. Pat. No. 5,734,933 which is a continuation of Ser. No. 08/321,916, filed Oct. 12, 1994, abandoned; which is a divisional of Ser. No. 08/053,961, filed Apr. 26, 1993 (U.S. Pat. No. 5,386,264); which is a continuation of Ser. No. 07/970,652, filed Oct. 30, 1992, abandoned; which is a continuation of Ser. No. 07/621,294, filed Jan. 23, 1991, abandoned; which is a divisional of Ser. No. 07/319,658, filed Mar. 6, 1989 (U.S. Pat. No. 5,012,270).

BACKGROUND OF THE INVENTION

1. Field of the Invention

This invention relates to an image shake detecting device which is highly suited for the automatic image stabilizing device of a video camera or the like and also to a device for controlling the image stabilizing device.

2. Description of the Related Art

In the image sensing optical apparatuses of varied kinds including video cameras, etc., irrespective as to whether they are adapted for industrial instrumentation, or consumer appliances, shaking of an image not only hinders easy image sighting but also degrades image recognizing accuracy. In the case of the video camera, for example, the camera is often operated while the operator is walking or while the camera is on a moving vehicle. In such a case, it is inevitable to have a sensed image shaken by a shake of the camera according to the photographing conditions or the object to be photographed.

To solve this problem, there have been proposed image shake detecting devices adopting varied methods. In one of such methods, the movement of the camera is physically detected by means of an acceleration sensor (an angular velocity sensor) and an optical system is compensated for the movement according to the direction and the degree of the movement. In another conceivable method, the parallel moving extent of the whole image plane is detected through a video signal and is expressed in a movement vector. Then, the optical system is compensated on the basis of the vector.

In accordance with the method of using the acceleration sensor, the size of the device becomes larger thus requiring increases in space and weight. Besides, it results in a complex structural arrangement. This method is therefore hardly suited for a home video camera such as a camera-incorporating type video tape recorder which must be compact in size and light in weight.

As regards the method of computing and obtaining the movement vector of the image plane from the video signal, some camera movement that is intentionally caused by the operator might be mistakenly detected for a shake of the image. The device also would respond to a movement of the object which is in realty not a shake of the image. That method thus also has a serious problem.

The above-stated known image shake detecting devices include, for example, an image stabilizing camera which is disclosed in Japanese Laid-Open Patent Application No. SHO 61-248681. The camera of this kind is arranged as follows: an optical image is converted into an electrical signal by means of an image sensing system which consists of a lens system and a photo-electric converting element. A TV image signal is obtained through a signal processing operation performed in a given manner on the electrical signal by a signal processing circuit. The image signal thus obtained is supplied to an image shake detecting circuit as well as to a monitor. A correlation between two image planes obtained at a given time interval is detected from the image signal to find the degree and the direction of any image shake. Then, a driving control circuit and a motor are operated-to control and move the lens system to offset the image shaking on the basis of the result of detection. The camera is thus arranged to be capable of obtaining a stable image even when the camera shakes.

However, the image shake detecting device which is arranged in this manner is incapable of making a discrimination between the movement of an object occurring only in a part of the image plane and a shake of the whole image plane. To solve this problem, the image shake detecting sensitivity of the device must be arranged to vary for the different areas of the image plane.

In connection with this problem, an image shake detecting device has been proposed as disclosed in an article entitled "About an Image Plane Shake Compensating Device," appeared in "The Technical Report" of the Television Society, Vol. 11, No. 3, p 43 to 48, PPOE, '87-12 (May, 1987). In the case of that device, the whole image plane is divided into 140 blocks of areas. A shake detection switch is arbitrarily turned on or off for each of these areas and an image shake is detected only from the areas for which the shake detection switch is turned on in accordance with a representing point matching method.

In accordance with the arrangement of this image shake detecting device, however, an image to be used as reference must be temporarily stored at a frame memory with its varied density values kept intact. To meet this requirement, the device necessitates the use of an analog-to-digital (hereinafter referred to as A/D) converter and a memory of a relatively large capacity. In addition to this shortcoming, the device is arranged to have one image plane superposed on another by staggering them to a certain degree of vector and to find out a vector that gives the highest degree of coincidence. Therefore, the operation of the device includes a large amount of computation. The device thus necessitates a circuit arrangement on a large scale and requires a long computing time.

Besides, it has been extremely difficult to have the image shake detecting device incorporated in a compact video camera which must be capable of carrying out real-time processing and must be arranged in a compact circuit arrangement, because: The above-stated device of the prior art necessitates the use of a large circuit arrangement including the A/D converter, the frame memory, a computing circuit, etc. and a long processing time.

Further, a control system which is provided for actually effecting shake compensation by driving a photo-taking optical system on the basis of information on a shake detected by the above-stated image shake detecting devices has been arranged as follows: Various methods have been known for correcting a displacement of an image. In one of these varied methods which has recently been contrived, there are provided optical compensation members such as a lens which is arranged to have its optical axis tiltable by a motor and a variable apex-angle prism. With an image obtained through an optical system which includes these optical compensation members, the deflected degree and the size of the image to be compensated on the basis of the image displacement are detected from the image. Then, the so-called feedback control is performed to deflect the image by driving the above-stated optical compensation members in accordance with information on the results of detection.

In the case of the device of this kind, a variable apex-angle prism which is arranged to have its apex angle variable is employed as an optical image deflecting means. A motor is used for driving the prism. The deflected degree of the image is detected in the following manner: The images of at least two TV camera image planes having a time difference between them are compared with each other. The deflection of the variable apex-angle prism is then controlled in such a way as to lessen displacement occurring between the two images compared, so that the images can be obtained always in a coinciding state. Further, in cases where the object to be photographed is traced (tracked) or where the object moves, the variable apex-angle prism is driven in such a way as to lessen the degree of the positional change of the object's image within the image plane. In a case where the image is shaken by a shake of the camera caused by something, the image is stabilized by driving the variable apex-angle prism in the same way as in the case of tracing the object to lessen the degree of the positional change of the object's image. Therefore, in these cases, the control is thus performed virtually in the same manner.

However, an interlaced scanning method is used for the TV camera or the like in general. In the case of the TV camera of the NTSC system, one image plane is formed and transmitted for every period of ⅟₆₀ sec (one field period). In a case where the feedback control method is employed for detecting the state of the image obtained by such a TV camera, the data of the feedback system consists of samples dispersed at intervals of at least ⅟₆₀ sec. Besides, the feedback action delays by a period of time required for a detection process plus a period of time required for image plane transmission (about ⅟₆₀ sec). The control output of the device, therefore, is unstable for any quick movement of the object. The response characteristic of the device is poor. In a case where the motor used for driving the optical compensation member has a good rise characteristic, a feedback coefficient exceeding 1 tends to cause oscillation. A further drawback of the prior art device resides in a poor frequency characteristic. These problems stem from the fact that the control is performed by using the control algorithm of a continuous time system while sampling by detecting means has a dispersive time delay.

Further, there has been proposed an apparatus which uses an image shake detecting device for objects appearing within an image plane and is arranged to trace (track) a moving object and to continuously perform control for accurate automatic focusing and accurate automatic exposure control. For example, apparatuses of this kind have been disclosed in U.S. patent applications Ser. No. 737,163 filed on May 23, 1985; Ser. No. 106,427 filed on Oct. 8, 1987; Ser. No. 154,078 filed on Feb. 9, 1988; Ser. No. 237,511 filed on Aug. 26, 1988; Ser. No. 240,915 filed on Sep. 6, 1988; Ser. No. 258,692 filed on Oct. 17, 1988; and Ser. No. 264,204 filed on Oct. 28, 1988. However, as mentioned in the foregoing, it is difficult to accurately make a discrimination between the movement of only one object in a part of the image plane and the movement of the whole image plane due to the movement of the camera. In accordance with the above-stated method disclosed in Japanese Laid-Open Patent Application No. SHO 61-248681, the degree of accuracy would lower if there is no luminance difference because the method utilizes a difference in luminance between the background and the object to be photographed. Further, in accordance with the technique disclosed in the above-stated Technical Report of the Television Society, it becomes difficult to accurately determine the areas in a case where a plurality of objects come to move. In other words, each of the methods of the prior art has a disadvantage as well as its advantage. Therefore, with the prior art image shake detecting devices incorporated in a compact video camera in accordance with these methods, they are incapable of adequately coping with every image conditions.

With respect to the image shake detecting device of this kind, further examples have been disclosed in U.S. patent application Ser. No. 855,732 filed on Apr. 25, 1986, U.S. patent application Ser. No. 880,152 filed on Jun. 30, 1986, etc. These patent applications disclose an image stabilizing camera which is arranged to compensate the optical axis of the lens system by detecting an image shake through the edge component of the image of an object to be photographed; and an arrangement to recognize an image through a histogram which represents the distribution of the feature of the image.

SUMMARY OF THE INVENTION

This invention is directed to the solution of the above-stated problems of the prior art. It is a first object of the invention to provide an image shake detecting device which is capable of accurately and stably detecting shaking of an image plane without mistaking a movement of an image resulting from shaking of the camera for an image movement resulting from a movement of a photographing object or from a panning movement of the camera or the like.

It is another object of the invention to provide an image shake detecting device for a camera which is arranged to detect a shaking state of either the image of a main object to be photographed or that of the background, whichever suits better to the state of the object, so that shake compensation can be most appositely made under all conditions including such cases where a picture of a moving object is to be taken with the camera fixed or with the camera moved to trace (track) the moving object.

It is a further object of the invention to provide an image shake detecting device which is simple in structural arrangement and excels in responsivity without necessitating the use of any special sensor.

To attain this object, an image shake detecting device which is arranged as a preferred embodiment of this invention to detect a shake of an image on an image sensing plane on the basis of an image signal output from image sensing means comprises: first detection means for detecting the displacement of the image on the basis of an image signal corresponding to a first detection area set on the image sensing plane; second detection means for detecting the displacement of the image on the basis of an image signal corresponding to a second detection area set on the image sensing plane; switching means for selecting one of the first and second detection means; and image shake detecting means for computing the shake of the image on the basis of an output of the first or second detection means selected by the switching means.

It is a further object of the invention to provide an image shake detecting and compensating device which performs no faulty action under any image plane condition.

It is a further object of the invention to provide an image shake detecting device which performs no faulty action even in cases where a feature of a main object to be photographed and that of the background of the object are hardly distinguishable from each other due to the low level of a high frequency component or sharpness, etc. obtained within the image plane.

To attain that object, an image shake detecting device which is arranged as a preferred embodiment of the invention to detect a shake of an image on an image sensing plane on the basis of an image signal output from image sensing means comprises: movement detecting means for detecting the displacement of the image on the basis of an image signal corresponding to a predetermined detection area set on the image sensing plane; compensating means for compensating for a movement of the image, by displacing an optical axis of a photo-taking optical system which images an incident light on an imaging plane of the image sensing means, on the basis of information on the displacement of the image output from the movement detecting means; sharpness detecting means for detecting a signal component indicative of a sharpness of the image on the basis of the image signal corresponding to the detection area; and control means for controlling an action of the compensating means on the basis of an output of the sharpness detecting means.

It is a further object of the invention to provide an image shake detecting device which is arranged to measure any deviation that occurs at a given feature point within each image plane during the process of scanning image planes which differ timewise from each other and to detect a quantity of the shake of an image on the basis of a measured value thus obtained.

It is a further object of the invention to provide an image shake detecting and compensating device which has the detection sensitivity for a quantity of the shake arranged to be variable and is capable of accurately discriminating a shake of the whole image plane from a local shake occurring on the image plane, so that the device always most appositely compensates for any image shake.

It is still a further object of the invention to provide an image shake detecting device which permits processing almost in real time, as a quantity of the image shake can be briefly computed during a vertical blanking period, and also permits reduction in size, weight and cost because of a simple circuit arrangement thereof which in principle obviates the necessity of having an A/D converter and storage and computing means on a large scale.

To attain the above-stated object, an image shake detecting device which is arranged as a preferred embodiment of the invention to detect a shake of an image on an image sensing plane on the basis of an image signal output from image sensing means comprises: extracting means for extracting a feature point from within the image sensing plane; detection means for detecting a difference in generation timing of the feature point between a plurality of temporally different images; computing means for computing a quantity of the shake of the image on the basis of an output of the detection means; and sensitivity control means for varying a sensitivity of the detection means.

It is an object of the invention to provide a control device for an image sensing optical system which is very stable and has a good response characteristic.

It is another object of the invention to provide a control device for an image sensing optical system which is capable of performing an image-stabilizing and object-tracing action to effectively compensate for any image displacement resulting from a movement of an object to be photographed and is advantageously applicable not only to a photo-taking optical system but also for image processing systems of varied kinds, on account of the following arrangement thereof: In view of a sampling period for dispersively detected information and the time delay of the detected information existing in cases where the controlled system is the image sensing system of a TV camera or the like, the amount of control operation for a feedback control system is computed and supplied to the controlled system. This greatly stabilizes the control output and improves the response and frequency characteristics. With the controlled system stabilized in this manner, the setting range of feedback coefficients can be broadened for the system.

It is an object of the invention to provide a compact control device which requires no special sensor nor any special optical part.

To attain that object, a control device for an image sensing optical system which is arranged as a preferred embodiment of the invention comprises: first control means for feedback-controlling the image sensing optical system on the basis of detection information obtained by timewise dispersively detecting a state of the image sensing optical system; memory means for storing control information obtained on the basis of a quantity of control performed over the image sensing optical system when the detection information is sampled; and second control means for controlling the image sensing optical system on the basis of a result obtained by computing the control information stored in the memory means and the detection information.

Further, another control device for an image sensing optical system according to this invention comprises: scanning means for scanning at the same speed a plurality of images obtained at intervals of a predetermined period of time; detection means for detecting a time difference between the plurality of images in timing at which corresponding points of feature are generated during a scanning process of the scanning means, by counting the number of clock pulses; computing means for detecting a quantity of a shake of an image by computing an output of the detection means; and sensitivity control means for varying a detection sensitivity of the detection means by changing a period of the clock pulses.

It is an object of the invention to provide an image processing device which is capable of accurately determining an object tracing area by statistically processing movement vectors obtained at a plurality of parts of an image plane.

It is another object of the invention to provide an image processing device which determines an object tracing area so that an object desired by the photographer to be stably positioned within an image plane can be automatically discriminated from other objects and is arranged to accurately operates even in cases where there is no distinct difference in luminance between these objects or where there are a plurality of moving objects.

To attain the above-stated object, an image processing device arranged according to this invention as a preferred embodiment thereof comprises: movement vector detecting means for detecting a movement vector of an image in each of detection blocks formed by dividing an image sensing plane; computing means for detecting a distributed state of an image movement within the image sensing plane by statistically processing the movement vector obtained from each of the detection blocks; and area discriminating means for detecting an area having an image of a main photographed object on the basis of an output of the computing means.

It is an object of the invention to provide an automatic focusing device which is capable of controlling a focus adjusting device on the basis of an optical flow of a plurality of movement vectors on an image plane.

It is another object of the invention to provide an automatic focusing device which is arranged to obtain the optical flow of an image plane by detecting movement vectors obtained within a plurality of blocks set on an image sensing plane, to detect a movement of a photographed object on the basis of displacement of the optical flow, to accurately determine whether the object is approaching to or moving away from a lens and to decide the restart of an automatic focusing action on the lens according to information on the result of determination.

To attain the above-stated object, an automatic focusing device arranged as a preferred embodiment of the invention comprises: focus detecting means for detecting a degree of focusing on an object in an image sensing plane to make focus adjustment; movement vector detecting means for detecting a movement vector of an image in each of detection blocks formed by dividing the image sensing plane; area detecting means for detecting an area having an image of the object by computing the movement vectors in the detection blocks; and control means for detecting a movement quantity of the image of the object on the basis of the movement vectors in the focus detection area detected by the area detecting means and for controlling the focus detecting means on the basis of the movement quantity.

Other objects and features of the invention will become apparent from the following detailed description of embodiments thereof taken in connection with the accompanying drawings.

BRIEF DESCRIPTION OF THE DRAWINGS

FIGS. 10(a) to 10(c) and 11(a) to 11(c) are timing charts showing the arrangement and the operation of a gate pulse generating circuit included in the image shake detecting circuit of the invention.

FIGS. 12(a) to 12(f) show in a timing chart a method for detecting an image shake in the vertical direction.

DETAILED DESCRIPTION OF THE PREFERRED EMBODIMENTS

Figure 1:
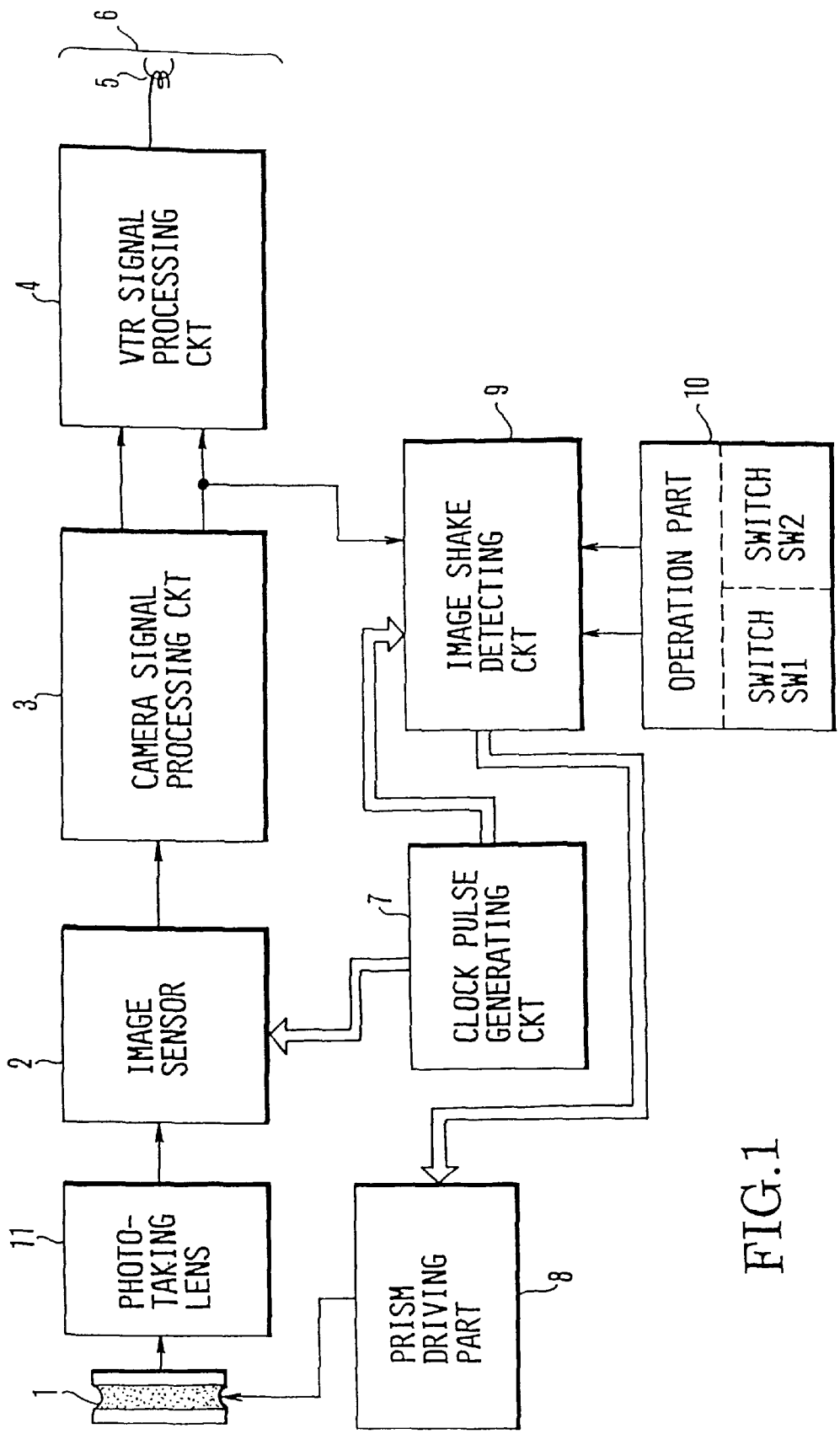
FIG. 1 is a block diagram showing an image shake detecting device which is arranged according to this invention as a first embodiment thereof and is shown as in a state of being applied to a camera-incorporating type video tape recorder.

The following describes with reference to the accompanying drawings image shake detecting devices embodying this invention respectively:

FIG. 1 shows a video camera to which an image shake detecting device arranged according to this invention is applied as a first embodiment thereof. The first embodiment is characterized in that: A camera shake will never be mistaken for a movement of an object to be photographed. A panning movement of the camera is also never mistaken for a movement of the object. The device thus permits effective compensation for a camera shake.

In the case of FIG. 1, the invention is applied to a camera-incorporating type video tape recorder the arrangement of which is shown in outline in a block diagram. Referring to FIG. 1, a variable apex-angle prism 1 is formed by filling a space between two parallel flat glass plates with a liquid and by sealing the filled space with something like a rubber bellows. The apex angle of the prism 1 is thus arranged to be variable in making compensation for an image shake. The shaking movement of an optical image can be compensated for in any direction with the optical axis of the prism tilted upward, downward, to the left or to the right by applying a load to a given peripheral part of the prism 1 by means of a prism driving part 8. A photo-taking lens 11 forms a photo-taking (or image sensing) optical system in conjunction with the variable apex-angle prism 1. An image sensor 2 which is composed of a photo-electric conversion element such as CCD or the like is arranged to convert an object's image formed on the photo-electric conversion plane thereof into an electrical signal corresponding to the object's image. A camera signal processing circuit 3 consists of an amplification circuit, a matrix circuit, a gamma correction circuit, an encoder, etc. and is arranged to convert a signal received from the image sensor 2 into a luminance signal and a carrier chrominance signal. A VTR signal processing circuit 4 is arranged to frequency-modulate the luminance signal, to low-band-convert the carrier chrominance signal and then to output these processed signals in a multiplex state. A magnetic head 5 is arranged to record on a magnetic tape 6 a video signal output from the VTR signal processing circuit 4. A clock pulse generating circuit 7 is arranged to generate a clock pulse for driving the image sensor 2 and also to supply an image shake detecting circuit 9 with timing signals of varied kinds. The image shake detecting circuit 9 is arranged to detect shaking of the image and to supply an image shake compensation signal to a prism driving part 8 as will be further described later herein. An operation part 10 is provided with various operation switches including a switch for selection of an image shake compensation mode as will be further described later.

The switches arranged within the operation part 10 includes a switch SW1 which is provided for selection of ON or OFF of an image shake detecting and compensating action; and a switch SW2 which is provided for selection of one of the following modes: A mode 1 in which an image shake detection area A1 is selected; a mode 2 in which a detection area A2 is selected; a mode 3 in which the detection area A1 or A2 is automatically set; a mode 4 in which the detection areas A1 and A2 are automatically set and ON an OFF of an image shake detecting action is automatically set.

Figures 4A, 4B:
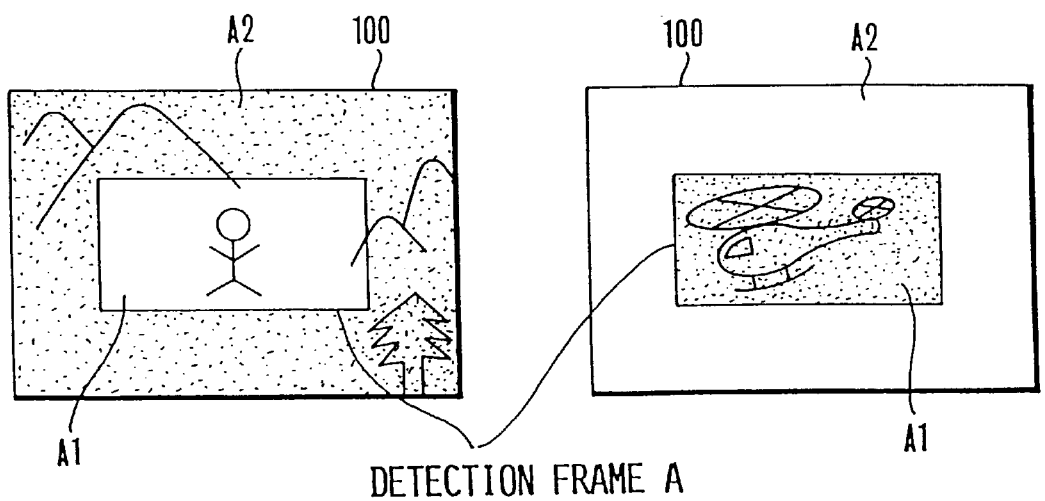
FIGS. 4(a) and 4(b) illustrate a shake detection area provided on an image sensing plane.

The image shake detecting device according to this invention operates to detect an image shake appositely to the state of an object's image on a principle which is as described below:

As shown in FIGS. 4(a) and 4(b), the image shake detecting device according to the invention is capable of detecting an image displacement occurred either in the detection area A1 which is within a detection frame A or in the detection area A2 which surrounds the frame A.

FIG. 4(a) shows a case in which a picture is taken with an object seized within the detection area A1 in the central part of the image sensing plane 100 and with the background fixed. In this case, the image displacement, i.e., an image shake, is detected through a video signal corresponding to the image of the fixed background in the peripheral detection area A2 by disregarding the object which is allowed to freely move in and round the central part of the image sensing plane 100.

In the case of FIG. 4(b), the camera is tracing (tracking) an object to keep it always located in the central part of the image sensing plane 100 while the object is moving at a relatively high speed. In that case, the moving object is nearly fixed within the central detection area A1 relative to the image sensing plane 100. Meanwhile, the background of the object is in a flowing state. Therefore, the shake of the image is detected through a video-signal corresponding to the image obtained within the central detecting area A1. However, in cases where the image of the whole image sensing plane 100 is flowing, the image shake detecting action is not performed.

The operation part 10 enables the operator to set the camera into a desired mode by manually operating the mode selection switches SW1 and SW2. However, it is also possible to have the mode setting operation automatically performed as will be described later.

Figure 2:
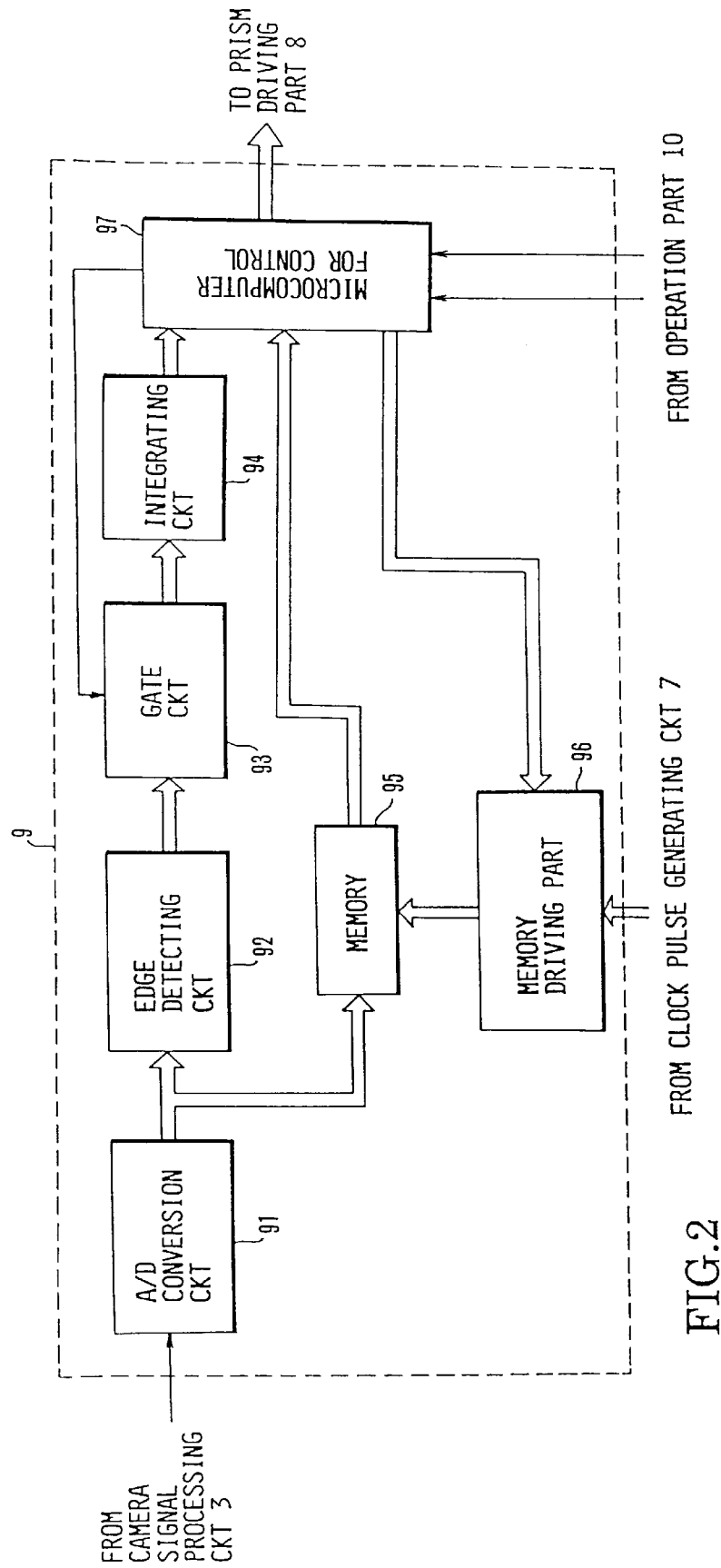
FIG. 2 is a block diagram showing the internal arrangement of the image shake detecting circuit of the first embodiment.
Figure 3:
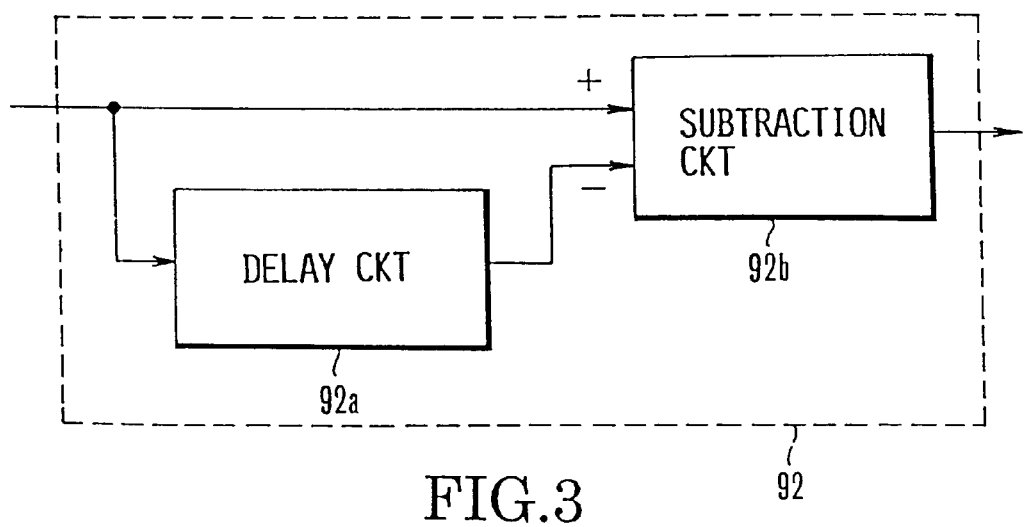
FIG. 3 is a block diagram showing an edge detecting circuit which is included in the image shake detecting circuit.

FIG. 2 shows the internal arrangement of the image shake detecting circuit 9. Referring to FIG. 2, an A/D conversion circuit 91 is arranged to convert into a digital signal the luminance signal output from the camera signal processing circuit 3. In this case, the A/D conversion does not have to be performed with a high degree of accuracy to have the luminance signal reproduced without deterioration. It may be performed merely to a patternizing degree so far as it permits detection of an image movement. In other words, the A/D conversion may be accomplished at a relatively coarse sampling frequency with a relatively coarse quantizing number of bits. An edge detecting circuit 92 is arranged to detect the edge part of the image formed on the image sensing plane 100. The circuit 92 is composed of, for example, a delay circuit 92a which has a delay time corresponding to several samples obtained by the A/D conversion circuit 91 and a subtraction circuit 92b as shown in FIG. 3. A delayed luminance signal obtained by delaying an input luminance signal is subtracted from the input luminance signal which has been converted into a digital signal. This arrangement enables the edge detecting circuit 92 to adequately detect any edge part of the object's image that suddenly changes. This edge detecting circuit 92 is provided for automatic selection of either the detection area A1 or the detection area A2 as will be further described later. The method employed for the edge detecting circuit 92 may be replaced with any other method as long as a high frequency component or the degree of sharpness of the image can be expressed by such other method. A gate circuit 93 operates under the control of a control signal coming from a control microcomputer 97. The gate circuit 93 is thus arranged to selectively pass either a video signal which corresponds to the central detection area A1 of the image sensing plane 100 or a video signal which corresponds to the peripheral detection area A2 of the image sensing plane 100. An integrating circuit 94 is arranged to integrate the video (luminance) signal passed by the gate circuit 93 for one field period. A memory 95 is arranged to be capable of storing one field period portion of the output of the A/D conversion circuit 91. A memory driving part 96 is arranged to generate a writing/reading clock pulse and an address for writing in or reading out from the memory 95 under the control of the control microcomputer 97.

Figure 8:
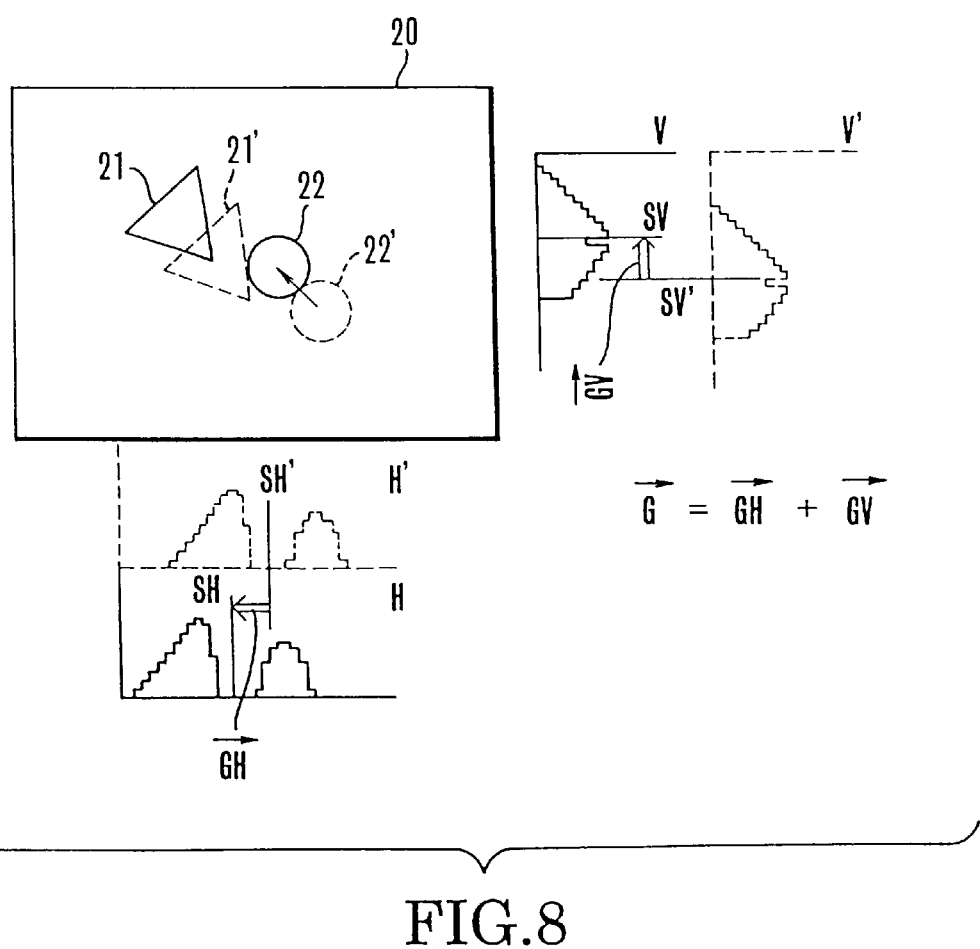
FIG. 8 illustrates a method for detecting a shake occurred in an image.

Referring to FIG. 8, the image shake detecting circuit 9 which uses the video signal performs a shake detecting operation in a manner as described below:

In FIG. 8, a reference numeral 20 denotes an image sensing plane. Numerals 21 and 22 denote the locations of objects obtained at a certain point of time. A reference symbol H denotes a histogram obtained in the horizontal direction from the level of the A/D converted luminance signal which is obtained at the same point of time. A symbol V denotes a histogram obtained in the vertical direction from the level of the A/D converted luminance signal which is also obtained at the same point of time. Further, reference numerals 21' and 22' denote the locations of the objects 21 and 22 obtained after the lapse of a given period of time. The reference symbols H' and V' denote histograms obtained respectively on the basis of the luminance signal level distribution obtained then in the horizontal and vertical directions. The positions of the centers of gravity SH, SV, SH' and SV' in the horizontal and vertical directions are respectively obtained from the histograms of the different points of time. Then, movement vectors $\overrightarrow{GH}$ and $\overrightarrow{GV}$ is computed on the basis of the shift of each center of gravity taking place during the lapse of time. After that, a composite vector $\vec{G}$ is computed as follows: Vector $\vec{G}=\vec{GH}+\vec{GV}$. This composite vector $\vec{G}$ represents the movement of the whole image plane, thus showing the direction and the size of a shake occurred.

The operation of the image shake detecting device embodying this invention is as described below: An incident light representing an image to be photographed is formed via the variable apex-angle prism 1 on the imaging plane of the image sensor 2. The image is photo-electric converted and output as a video signal. The video signal thus output from the image sensor 2 is processed by the camera signal processing circuit 3 and the VTR signal processing circuit 4. The processed signal is supplied to the magnetic head 5 to be recorded on the magnetic tape 6. Further, the luminance signal which is output from the camera signal processing circuit 3 is supplied to the image shake detecting circuit 9. Within the image shake detecting circuit 9 which is arranged as shown in FIG. 2, the input video signal is sampled in a given cycle by means of the A/D conversion circuit 91 to be converted into a digital signal. The digital signal thus obtained is supplied to the edge detecting circuit 92 to have an edge part of the image, i.e., a part showing a sudden level change, detected by the circuit 92. Meanwhile, the digital signal is also supplied to the memory 95 to have one field of image data stored there.

An edge signal output from the edge detecting circuit 92 is supplied to the gate circuit 93. Then, the control microcomputer 97 extracts only a portion of the edge signal representing either the detection area A1 or the detection area A2 which is selected according to the state of the image as shown in FIGS. 4(*a*) or 4(*b*). The signal thus extracted is integrated for a period of one field. The integrated signal is then supplied to the control microcomputer 97. Meanwhile, data which is obtained by A/D converting one image plane portion of the luminance signal is stored by the memory 95. Then, the image information thus stored is supplied to the control microcomputer 97.

The control microcomputer 97 selects the detection area A1 or the detection area A2 by controlling the gate circuit 93. The integrated edge values of the detection areas are compared with each other to determine which of them has a larger integrated value. The luminance signal data which corresponds to the area thus determined and which is stored by the memory 95 is then read out from the memory 95 to prepare histograms for horizontal and vertical directions in a manner as described in the foregoing with reference to FIG. 8. The center of gravity of the image formed on the image sensing plane is computed and obtained from the histograms. The center of gravity thus obtained is then compared with another center of gravity which is obtained from the image on the image sensing plane after the lapse of a given period of time. By this, a movement vector $\vec{G}$ which indicates the size and the direction of image displacement, i.e., an image shake, occurred during the lapse of time is obtained by computation. Then, the data of this vector $\vec{G}$ is supplied to the prism driving part 8. In accordance with the data, the prism driving part 8 changes the apex angle of the prism 1 in such a way as to offset the size and the direction of the image displacement. A compensation thus can be effected for the image shake or displacement.

Figure 5:
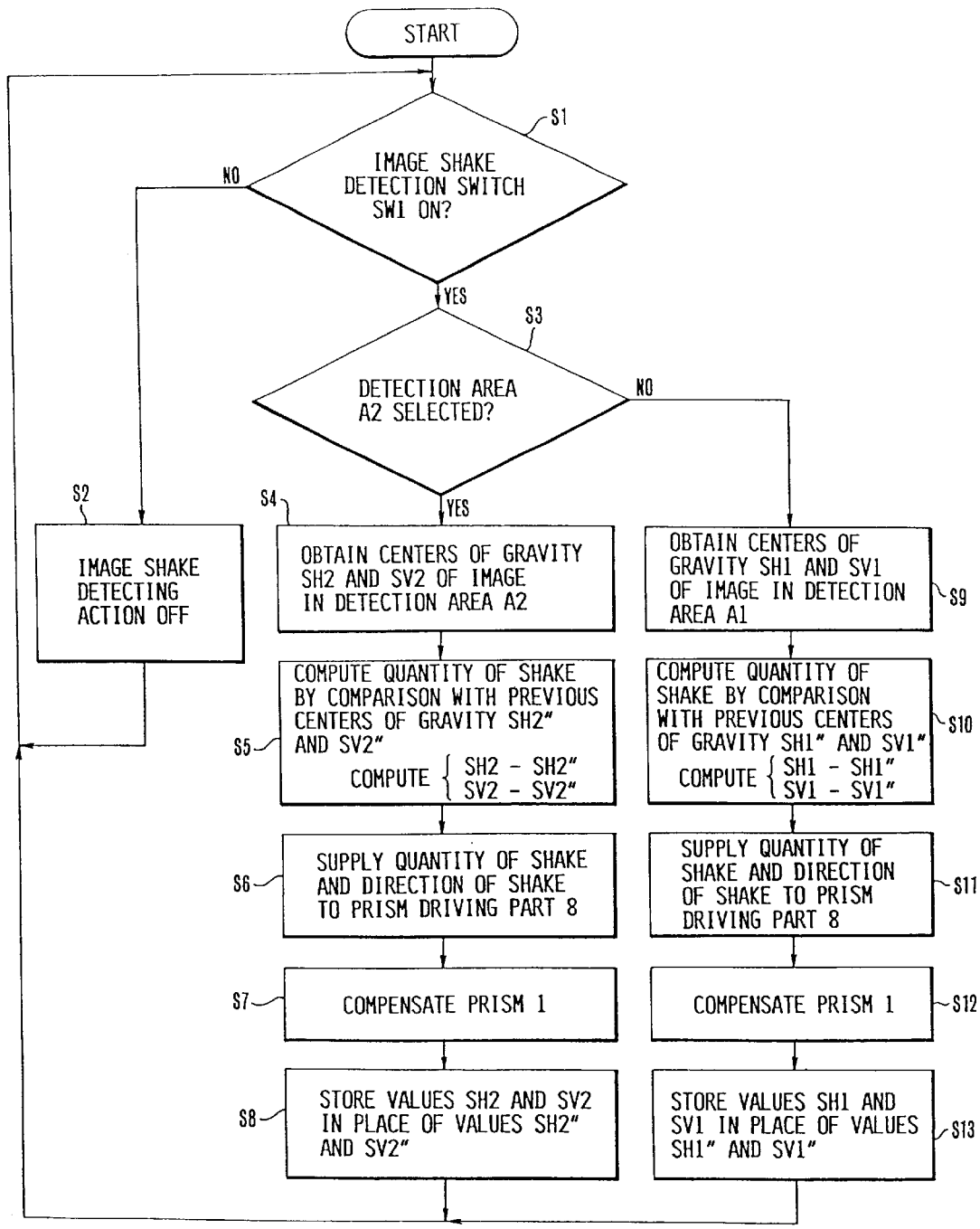
FIG. 5 is a flow chart showing the algorithm of image shake detecting and compensating actions.

FIG. 5 shows an algorithm to be executed when the operator operates the operation part 10 of the invented image shake detecting device to manually select the shake detection area A1 or A2 (selection between the modes 1 and 2) while watching the image sensing plane. As stated in the foregoing, the operation part 10 includes, among others, the switch SW1 which is provided for causing an automatic shake detecting and compensating operation to begin or to come to a stop; and the mode selection switch SW2 which permits manual selection of either the detection area A1 or the detection area A2.

Referring to FIG. 5, the switch SW1 is first checked, at a step S1, to see if it has been turned on. If not, the flow of operation proceeds to a step S2. At the step S2, the image shake detecting circuit 9 is turned off and then the flow comes back to the step S1. If the switch SW1 is found to be on at the step S1, the flow proceeds to a step S3. Step S3: The switch SW2 is checked to see which of the central detection area A1 and the peripheral detection area A2 of the image sensing plane 100 is selected. If the peripheral detection area A2 is found to have been selected, the flow comes to a step S4. Step S4: The control microcomputer 97 reads out from the memory 95 the luminance signal data of the detection area A2 shown in FIG. 4(*a*) to prepare the horizontal and vertical histograms as shown in FIG. 8 and computes the centers of gravity SH2 and SV2. After that, the flow proceeds to a step S5. Step S5: The centers of gravity SH2 and SV2 are compared by computation with centers of gravity SH2" and SV2" obtained a given period before to find any difference. A vector representing any change in center of gravity is analyzed. The flow then comes to a step S6. Step S6: Image shake compensation data which is obtained by analyzing the vector is supplied to the prism driving part 8. Step S7: The variable apex-angle prism 1 is driven to adjust the optical axis thereof in the direction of offsetting the image displacement by controlling the vertical angle of the prism 1 according to the data supplied. These steps are suitable to a case where a picture is taken by seizing a main object within the central part of the image sensing plane with the background of the object fixed. An image shake can be detected in reference to the background and the prism can be compensated for the image shake.

Upon completion of the compensation, the flow of operation proceeds to a step S8. Step S8: The center-of-gravity values SH2" and SV2" which have been stored till then are replaced with the horizontal and vertical center-of-gravity values SH2 and SV2 to have the values SH2 and SV2 stored till a next detection process. The flow then comes back to the step S1.

In a case where the central detection area A1 of the image sensing plane is found to have been selected at the step S3, thus indicating that the object is moving at a relatively high speed as shown in FIG. 4(*b*), and that the camera is tracing (tracking) the object keeping the image of it approximately within the central detection area A1, the flow comes to a step S9 to detect an image shake in reference to the object. Step S9: The control microcomputer 97 reads out from the memory 95 the luminance signal data for the detection area A2 which is as shown in FIG. 4(*b*). Histograms for the horizontal and vertical directions are prepared as shown in FIG. 8. The centers of gravity SH1 and SV1 of the image are obtained from the histogram. Step S10: Then, like at the steps S5 to S7, the center-of-gravity values SH1 and SV1 are compared with previous center-of-gravity values SH1" and SV1" which are obtained, for example, for an immediately preceding field. Step S11: Information on the degree and the direction of the image shake thus obtained is supplied to the prism driving part 8. Step S12: The optical axis of the prism 1 is adjusted to compensate for the image shake. After this, the flow comes to a step S13. Step S13: The center-ofgravity values SH1 and SV1 of the current image plane is stored in place of the previous center-of-gravity values SH1" and SV1" and then the flow comes back to the step S1.

With these steps repeatedly executed, the image shake compensation can be accomplished in reference to the detection area manually selected by the operator.

While the shake detection area A1 or A2 is manually selected by the operator in the case of the flow of operation described above, the detection area can be automatically selected according to this invention. The embodiment automatically selects, according to the state of the object to be photographed, the detection area for detecting a quantity of an image shake taking place within the image sensing plane by means of the edge detecting circuit 92, the gate circuit 93 and the integrating circuit 94.

Figure 6:
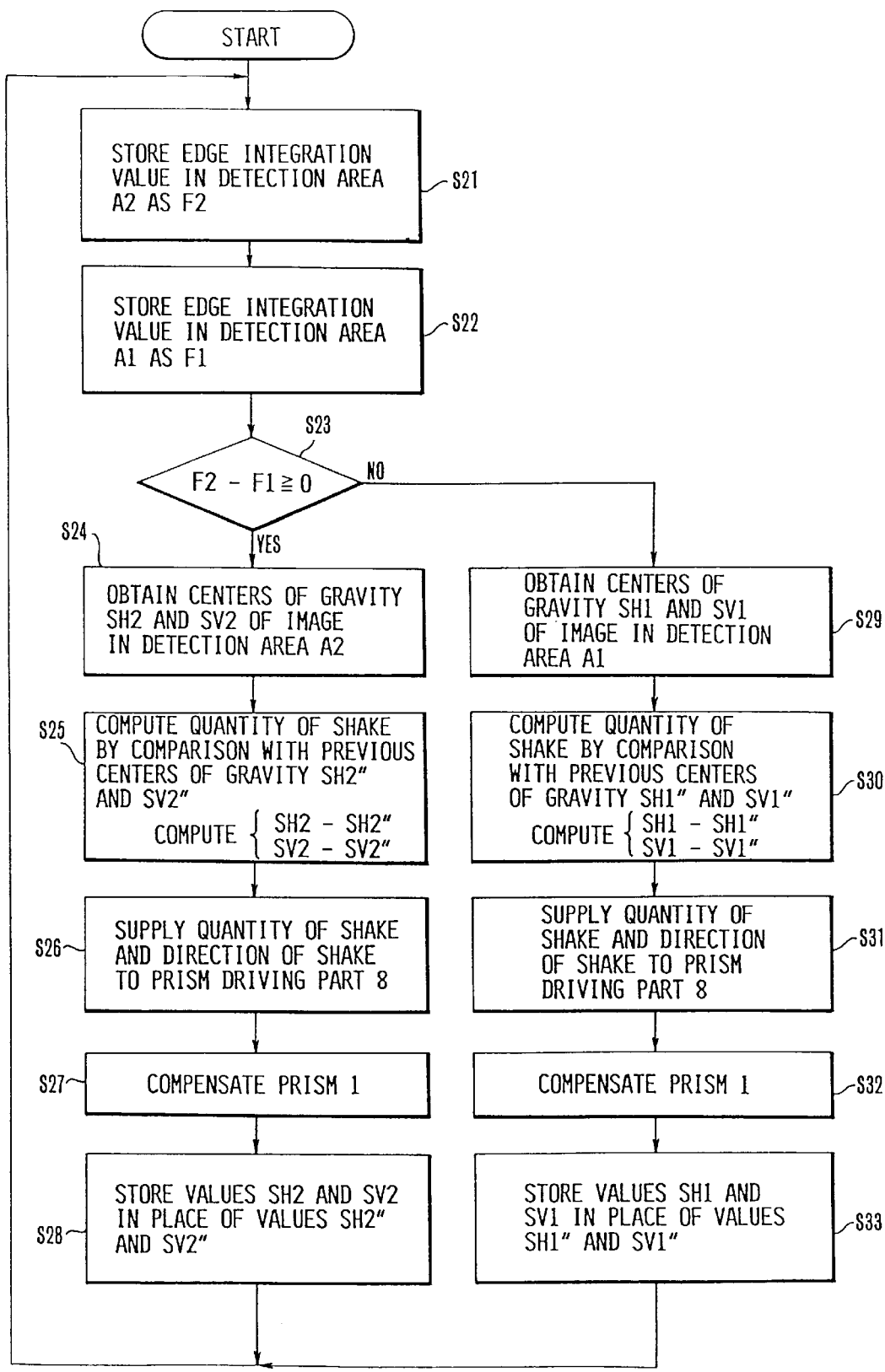
FIG. 6 is a flow chart showing, as a second embodiment of the invention, the algorithm of image shake detecting and compensating actions.

Referring to FIG. 6 which is a flow chart, the embodiment in the above-stated case operates as follows: In order to have the shake detection area A1 or A2 of the image sensing plane automatically set, the switches SW1 and SW2 of the operation part 10 is operated to select the mode 3 in which image shake detecting and detection area setting actions can be automatically performed.

At a step S21 of FIG. 6, the control microcomputer 97 which is provided within the image shake detecting circuit 9 controls and causes the gate circuit 93 to pass only the signal of the detection area A2 set outside of the detection frame A on the image sensing plane 100. As a result, edge information on the detection area A2 is supplied from the edge detecting circuit 92 to the integrating circuit 94. Then, an edge integration value obtained by the integrating action of the integrating circuit 94 is supplied t6 the control microcomputer 97 and is stored as data F2. The flow of operation then proceeds to a step S22. Step S22: The gate circuit 93 is controlled and caused to pass the signal of the detection area A1 which is within the detection frame A of the image sensing plane. Then an edge integration value of the detection area A1 is also supplied from the integrating circuit 94 to the microcomputer 97 as data F1. Step S23: The edge integration values of the detection areas A1 and A2 which are set inside and outside of the detection frame A are compared with each other through a data computing operation "F2−F1" to find whether the result of computation is not less than 0. In other words, a check is made to find which of the two areas has a larger image part that is effectively usable for image shake detection. In a case where the detection areas A1 and A2 differ in size, the edge integration values of them cannot be compared on an equal basis. In that case, therefore, some normalizing or weighting process is suitably performed according to the difference in size between the two detection areas.

In a case where the result of comparison between the data F2 and F1 is found at the step S23 to be F2−F1≦0, thus indicating that the edge integration value of the detection area A2 is either larger than or equal to that of the detection area A1, the flow proceeds to a step S24. At the step S24, the detection area A2 is selected. Then, image data which corresponds to the detection area A2 and is stored within the memory 95 is taken out and supplied to the control microcomputer 97. After that, ensuing steps S24 to S28 are executed, in the same manner as in the case of the steps S24 to S28 of the flow chart of FIG. 5, to obtain the center-of-gravity values SH2 and SV2 of image obtained in the detection area A2; to compute the shaking degree by comparing the values SH2 and AV2 with stored previous values SH2" and SV2"; to obtain a movement vector; and to supply information on the quantity and direction of the shake to the prism driving part 8. The prism driving part 8 then changes the apex angle of the variable apex-angle prism 1 to compensate and adjust the optical axis thereof in the direction of offsetting the image shake occurred. After completion of the compensation of the prism 1, the center-of-gravity values SH2 and SV2 are newly stored to be used for a next detecting process.

In a case where the result of computation on data F2 and F1 is found to be F2−F1<0 at the step S23, thus indicating that the edge integration value of the detection area A2 is smaller than that of the detection area A1, the flow comes to a step S29. At the step S29, the central detection area A1 is selected. Image data which corresponds to the detection area A1 and is stored within the memory 95 is taken in by the control microcomputer 97. Then, steps S29 to S33 are executed in the same manner as in the case of the steps S9 to S13 of the flow chart of FIG. 5. In other words, the quantity of the image shake is detected in reference to the central detection area A1. The variable apex-angle prism 1 is driven to have its optical axis compensated for the image shake. The embodiment is thus arranged to compare the edge integration values of the detection areas A1 and A2 with each other, to automatically select one of these area that has a greater amount of edge components required in detecting the quantity of image displacement and to be capable of detecting the quantity of the image shake under such a condition that ensures a higher detection accuracy.

In the case of FIG. 4(a), a main object to be photographed is moving in the central part of the image sensing plane against a stationary background. In such a case, the high frequency component and the edge component of the image signal are obtainable mostly from the background. The background in this case thus gives a larger edge integration value. FIG. 4(b) shows another case where the object is kept within the central detection area against a flowing background. In that case, the edge integrated value of the central detection area becomes larger. The embodiment always selects the detection area having a larger edge integration value than the other, so that an image shake can be accurately detected and compensated for with a high degree of reliability.

Figure 7:
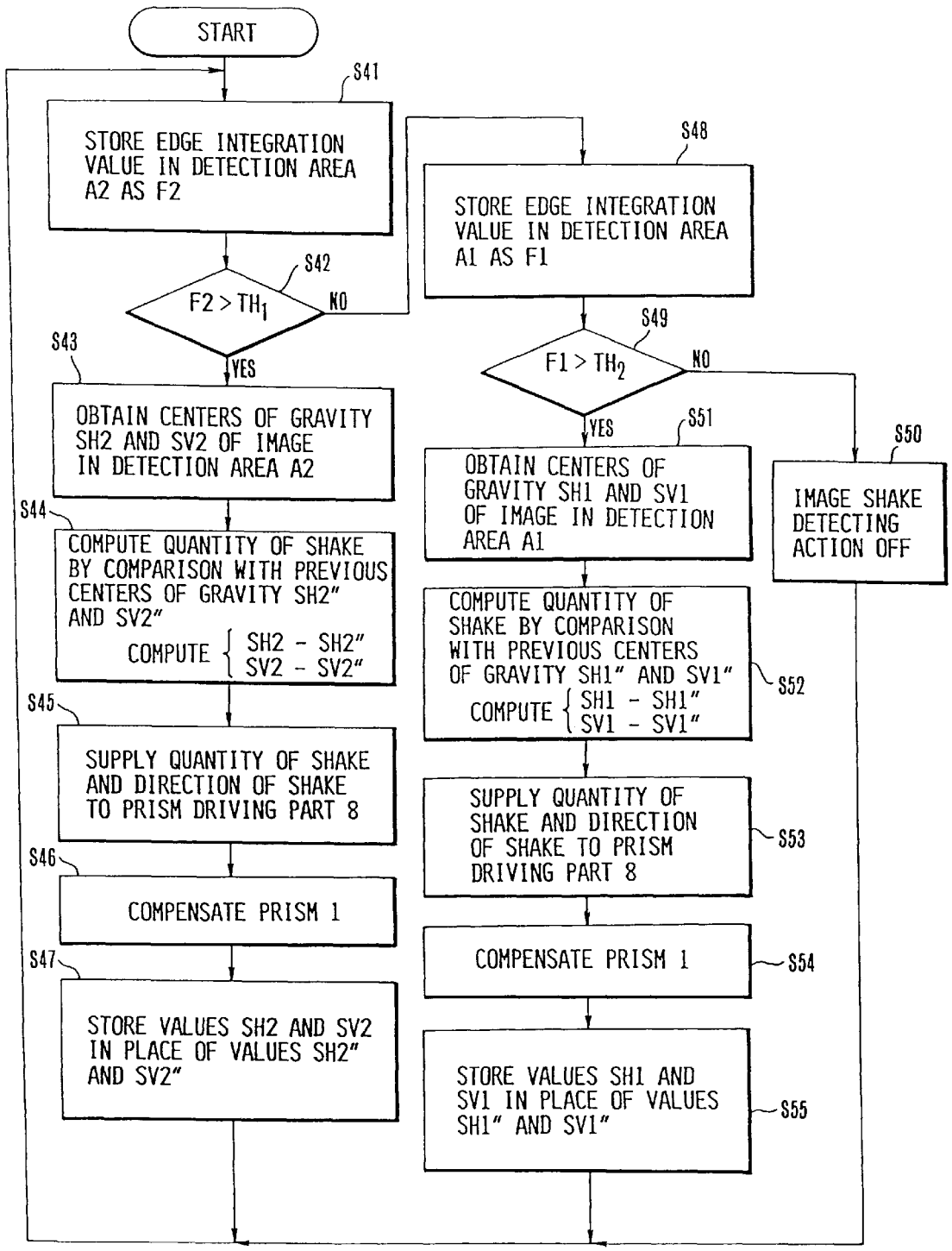
FIG. 7 is a flow chart showing, as a third embodiment of the invention, the algorithm of image shake detecting and compensating actions.

FIG. 7 shows in a flow chart a third embodiment of the invention. The embodiment is shown as in a state of operating in a mode 4. The mode 4 is arranged such that, in addition to the automatic setting process for setting an image shake detection area, the embodiment automatically makes a decision as to whether the image shake detecting action is to be carried out. In this case, the switch SW2 is operated to select the mode of automatically setting the detection areas A1 and A2 and automatically causing the image shake detecting process to begin or not to be performed.

At a step S41 of FIG. 7, the control microcomputer 97 which is disposed within the image shake detecting circuit 9 first controls and causes the gate circuit 93 to set a gate for the detection area A2. Then, the edge integration value of the detection area A2 is taken in as data F2. After that, the flow proceeds to a step S42. Step S42: The edge integration value data F2 is checked to see if it is larger than a predetermined level value TH1. If so, the flow of operation comes to steps S43 to S47 to perform the image shake detecting process for the detection area A2; and the prism 1 is driven to have its optical axis compensated for the image shake. The steps 43 to S47 are executed in exactly the same manner as the steps S24 to S28 and therefore the description of them is omitted from the following description.

In a case where the edge integration value F2 is found at the step S42 to be not larger than the level value TH1, the flow comes to a step S48. Step S48: The control microcomputer 97 controls and causes the gate circuit 93 to set a gate for the detection area A1. Then, the edge integration value of the detection area A1 is taken in as data F1. The flow then proceeds to a step S49. Step S49: The edge integration value F1 is compared with a predetermined level value TH2. If the value F1 is found to be larger than the value TH2, the flow comes to execute steps S51 to S55. At the steps S51 to S55, the image shake detecting process is carried out in reference to the detection area A1. The prism 1 is driven to have its optical axis compensated for the image shake. These steps S51 to S55 are executed in exactly the same manner as the steps S29 to S33 of the flow chart of FIG. 6 and, therefore, details of them are omitted from description.

If the result of the check made at the step S49 is F2≦TH2, the flow proceeds to a step S50 to come back to the step S41 without performing the image shake detecting and compensating actions.

In other words, the image shake detecting action is performed in reference to the detection area A2 when the edge integrated value obtained from the detection area A2 is sufficient for image shake detection or in reference to the central detection area A1 if the information on the image obtained within the detection area A2 is found to be insufficient. Further, in cases where image shake detection is impossible or cannot be reliably accomplished as the edge integration values obtained for both the detection areas A2 and A1 are insufficient, the embodiment can be controlled and caused to perform no image shake detecting action. For example, in the event of a panning movement or the like of the camera, the image of the whole image sensing plane are flowing or moving including both the background and the object's image in the central part of the image sensing plane. Then, both the high frequency component and the edge component become lower and the edge integration values also decreases. In that event, the image shake detecting and compensating actions are inhibited.

Further, the image shake detecting and compensating actions are likewise not performed in a case where no shake compensation is required when there is almost no image on the image sensing plane or in the event of a featureless flat image, because the edge integration values decrease also in such a case.

The embodiment is capable of reliably carrying out the image shake detecting and compensating operation in all situations. Besides, the operating mode of the embodiment is selectable either manually or automatically according to the condition of the object.

As described in the foregoing, the image shake detecting device according to the invention is arranged to detect image shaking and to make compensation for the shake according to the condition of the object in reference to either the image of the object or that of the background whichever is better suited for shake detect ion. Therefore, the device is capable of always most appositely making compensation for shaking in all cases including a case where a picture of a moving object is taken with its imaged position fixed and another case where the camera is moved to trace a moving object.

Further, since the operation described is performed by using the video signal, the embodiment can be arranged in combination and along with other functions including automatic focusing, automatic exposure and automatic tracing functions. The control and selection of the detection area can be accomplished through the video signal without having recourse to any additional sensor. This is a great advantage of the embodiment.

Figure 9:
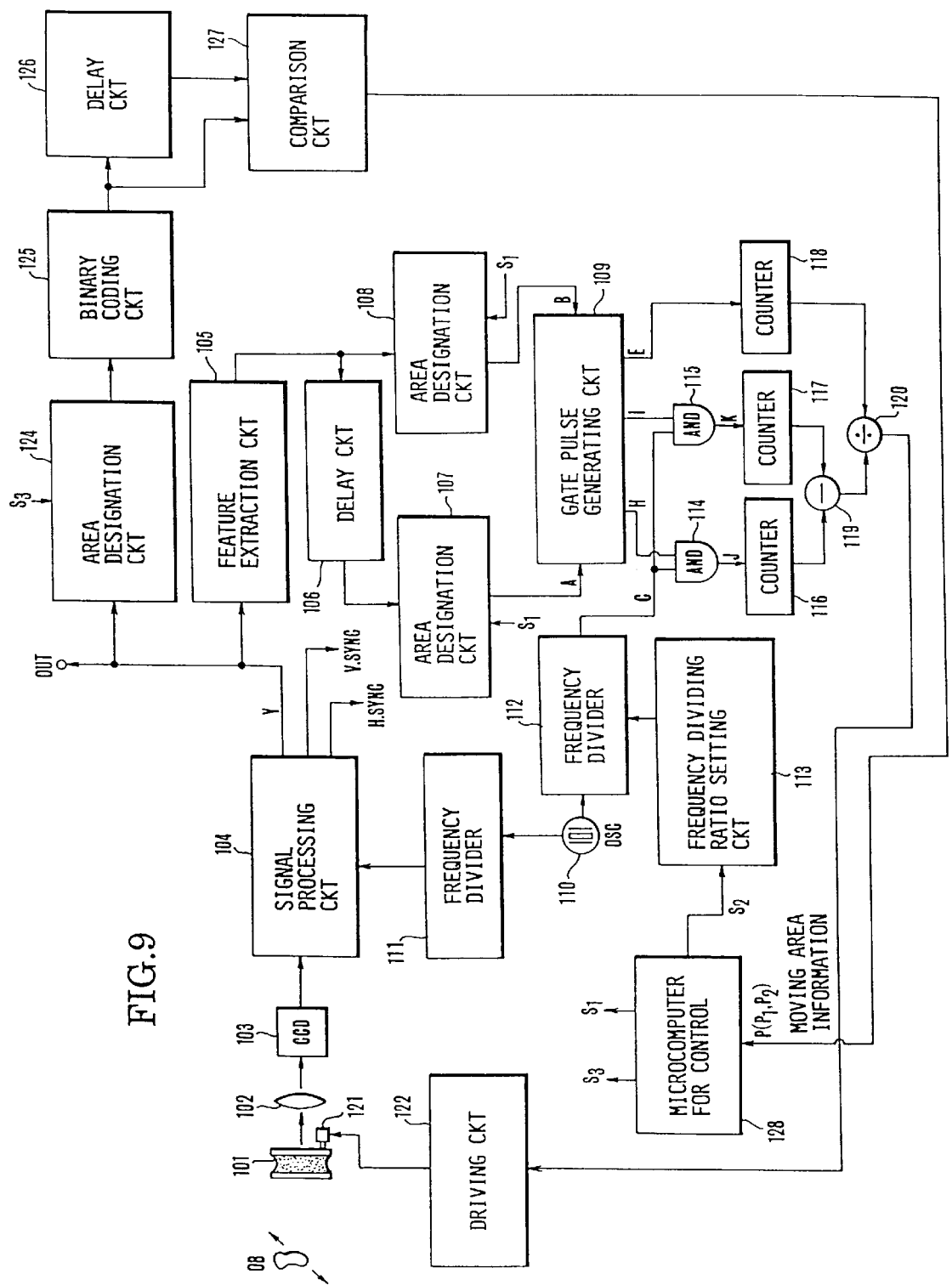
FIG. 9 is a block diagram showing an image shake detecting device arranged as a fourth embodiment of the invention. The device is shown as in a state of being applied to an image stabilizing type camera.

FIGS. 9 to 13(b) relate to an image shake detecting device which is arranged according to this invention as a fourth embodiment thereof. The fourth embodiment is arranged to be capable of carrying out the image shake detecting and compensating actions in real time without mistaking an image shake of the image sensing plane for an image movement occurring only in a part of the image sensing plane and vice versa. For this purpose, shaking of the image is detected on the basis of deviation of the generation timing of a feature point appearing on the image plane; and the detection sensitivity of the image shake detecting device is arranged to be variable and adjustable to make the device capable of coping with all different types of image movement occurring within the image sensing plane. The details of the fourth embodiment are as described below with reference to the above-stated drawings:

FIG. 9 is a block diagram showing the image shake detecting device as in a state of being applied to a video camera. The illustration includes an object OB; a variable apex-angle prism 101; a photo-taking lens 102; an image sensor 103 which is a two-dimensional CCD or the like and is arranged to convert into an electrical signal an object's image formed on its imaging plane by the photo-taking lens 102; a signal processing circuit 104 which is arranged to perform a gamma correction process, a blanking process, synchronizing signal adding process, etc. on the image signal output from the image sensor 103 for the purpose of converting the signal, for example, into a standardized TV signal of the NTSC system; a video signal output terminal OUT; a luminance signal Y; a horizontal synchronizing signal H.SYNC; and a vertical synchronizing signal V.SYNC. A feature extraction circuit 105 is arranged to detect a feature point of the object's image from the luminance signal Y output from the signal processing circuit 104. For example, the circuit 105 is a binary coding circuit which is arranged to produce, for example, a binary signal representing the edge parts of the luminance signal Y.

A delay circuit 106 is arranged to delay for a given period of time the binary coded edge signal output from the feature extraction circuit 105. Area designation circuits 107 and 108 are arranged to designate a shake detection area of the image sensing plane in accordance with instructions S1 output from a control microcomputer 128 which will be described later. A gate pulse generating circuit 109 is arranged to generate a gate pulse signal for a period of time during which the output timing of a signal corresponding to the area designated by the area designation circuits 107 and 108 is deviating thus indicating a deviation of the featuring point. The illustration also includes a quartz crystal oscillator 110; frequency dividers 111 and 112 which are arranged to frequency-divide the output of the oscillator 110; a frequency dividing ratio setting circuit 113 which is arranged to change, in accordance with a control signal S2 from the control microcomputer 128, the frequency dividing ratio of the frequency divider 112 from one ratio over to another between at least two different frequency dividing ratios; AND circuits 114 and 115; and pulse counters 116, 117 and 118. A subtracter 119 is arranged to obtain a difference between the outputs of the pulse counters 116 and 117. A divider 120 is arranged to divide the output of the subtracter 119 by the output of the pulse counter 118. The output of the divider 120 is produced as a component representing a quantity of shake in one direction. A prism driving mechanism 121 includes an actuator such as a piezoelectric element or the like which is provided for changing the apex angle of the variable vertical-angle prism 101 by driving the prism 101. A driving circuit 122 is arranged to drive the prism driving mechanism 121 according to information on the quantity of shake output from the divider 120 in the direction of offsetting the quantity of shake.

Meanwhile, blocks 124 to 127 represent circuits elements provided for detecting the position of any part of the image sensing plane that has a local image movement on the image sensing plane. Any local image movement that takes place on the image sensing plane can be prevented from being mistaken for a shaking movement of the whole image sensing plane by virtue of these circuit elements, which include: an area designation circuit 124 which is arranged to generate a gate signal for dividing the image sensing plane into an m×n number of blocks as shown in FIGS. 13(*a*) and 13(*b*); a binary coding circuit 125 which is arranged to convert the luminance level of a video signal corresponding to each of the m×n number of blocks into a binary value using a predetermined threshold level; a delay circuit 126 which is arranged to delay for a period of one field an image signal corresponding to one image plane which is binary converted by the binary coding circuit 125 for each of the m×n blocks or areas; and a comparison circuit 127 which is arranged to compare each area of the image plane of the current field which is binary converted by the binary coding circuit 125 with that of the image plane preceding by one field and to produce movement area information P which indicates the position on the image plane of any area that is found to have a change in the binary information. This information P is supplied to the control microcomputer 128.

The control microcomputer 128 performs overall control on all the circuit elements including the area designation circuits 107 and 108, the frequency dividing ratio setting circuit 113, etc. The computer 128 produces control signals S1, S2 and S3 for controlling the generation of gate signals to be generated at the area designation circuits 107, 108 and 124 respectively. The control signal S2 is produced on the basis of the moving area information P (P1 and P2) supplied from the comparison circuit 127. The frequency dividing ratio of the frequency dividing ratio setting circuit 113 is controlled by the control signal S2.

In FIGS. 10(*a*) to 10(*c*), reference parts A to K respectively show signals obtained on the signal lines A to K shown in various parts of FIG. 9. The image shake detecting device described as the fourth embodiment of this invention operates in the following manner:

An incident optical image obtained via the variable apex-angle prism 101 and the photo-taking lens 102 is converted by the image sensor 103 into an image signal. The image signal which is to be used in detecting an image shake is supplied to the feature extraction circuit 105. The circuit 105 converts the edge information on this signal into a binary signal. The binary signal is delayed for a predetermined period of time by the delay circuit 106 before it is supplied to the area designation circuit 107 and, at the same time, is directly supplied to the area designation circuit 108 without delay. The delay time of the delay circuit 106 is set at a value which is an integer times as much as one field period. Therefore, the delay circuit 106 gives edge information, i.e. a feature point, of an image plane which is the same as the image plane currently under a scanning process but is obtained a predetermined period before the current image plane. Then, with the feature point detection signals which are binary signals supplied to the area designation circuits 107 and 108, the circuits 107 and 108 extract only the signal parts which corresponds to a detection area set on the image sensing plane. The signal parts thus extracted are supplied respectively to the gate pulse generating circuit 109.

The shake detection area is set for the following reason: If the shake detection area is, for example, close to a peripheral part of the image sensing plane, the feature point tends to be brought outside of the image sensing plane by an image shake. Under such a condition, it often becomes impossible to correlate two fields with each other. Therefore, the image shake detection area is preferably not set within a given peripheral range (several %, for example) of the image sensing plane.

In view of this, the shake detection area of this embodiment is set as shown in FIGS. 13(*a*) and 13(*b*). Referring to these drawings, a peripheral area of the image sensing plane measuring two blocks in width are set to be a non-detection area by setting a shaking degree detecting clock signal at "0". The arrangement of FIGS. 13(*a*) and 13(*b*) will be described later in further detail.

The gate pulse generating circuit 109 receives the outputs A and B of the area designation circuits 107 and 108 respectively. The circuit 109 examines a correlation between these signals A and B and generates a gate pulse signal of pulse width which corresponds to a deviation time difference between pulses which represent one and the same image. This gate pulse generating circuit 109 is arranged to produce a pulse signal H which is generated when the image of the current field deviates from the image of a reference field in the scanning direction; a pulse signal I which is generated when the current image deviates in the direction opposite to the scanning direction; and a pulse signal E which is generated every time a feature point of the image appears during a scanning process. The longer these gate pulse signals H and I are, the larger the quantity of the image shake is. The gate pulse generating circuit 109 obtains the logical product (AND) of the gate pulses H and I and a clock pulse C which is generated by frequency dividing the oscillation frequency of the quarts crystal oscillator 110; passes the clock pulse to the counters 116 and 117 while the gate pulses H and I are being produced; measures the lengths of the gate pulses by counting the number of clock pulses; and obtains the quantity of image shake in reference to a feature point of the image represented by the pulse signal E. In the event of a plurality of feature points existing on one whole image plane, the quantity of image shake of the whole image plane can be obtained by dividing the total of the feature points by the total of the pulse count values corresponding to the quantity of image shake represented by the gate pulse signals H and I. This computing operation is carried out during a vertical blanking period.

The movement of images is complex in general. All the feature points do not always move in the same direction depending on the conditions of the object and its background. In view of this, therefore, this embodiment is arranged to obtain gate pulse lengths of the signals of two channels A and B for different fields and to find a difference between them by the subtraction circuit 119. The subtracting operation of the subtraction circuit 119 and the dividing operation of the dividing circuit 120 are performed only once per field and may be performed all in integral numbers. The length of time required for the computing operations is short and the computing circuits can be simply and compactly arranged.

The information on the quantity of image shake which is output from the dividing circuit 120 through the above-stated arrangement and operations is supplied to the prism driving circuit 122. Upon receipt of the information, the prism driving circuit 122 operates the actuator of the prism driving mechanism 121 to drive thereby the variable apex-angle prism 101 in the direction of offsetting the quantity of image shake. Compensation is thus effected for the image shake.

A practical gate pulse generating algorithm required for the above-stated operation of the gate pulse generating circuit 109 is described below with reference to the timing chart of FIGS. 10(a) to 10(c):

FIG. 10(a) shows an object pattern (image) OB as in a state of moving to the right (as viewed on the drawing) during an interval period between two temporally different fields 1 and 2. FIG. 10(b) shows it as in a state of moving to the left. FIG. 10(c) shows it as in a state of not moving but having its area of a binary converted image pattern narrowed by a change in illumination or the like.

In FIGS. 10(a) to 10(c), parts A to G respectively denote the wave forms of signals shown on the corresponding signal lines shown in FIG. 9. The part A shows the binary signal of the reference field. This binary signal A represents an image obtained for a field preceding the current field by a given number of fields (one field period before in the case of this embodiment). The part B shows the binary signal of the image of the current field. The part C shows a clock signal output from the oscillator 110 via the frequency divider 110.

The part D shows the logical sum (OR) of the signals A and B. The part E shows the logical product (AND) of the signals A and B. The part F shows a pulse signal which rises at the front edge part of the signal A and falls at the rear edge part of the signal B. The part G shows a pulse signal which rises at the front edge of the signal B and falls at the rear edge of the signal A. The part H shows a pulse signal representing a logical difference obtained from a difference between the signals F and G. The length of this pulse signal H, i.e., its pulse width, indicates the extent of the rightward movement of the object OB. The part I shows a pulse signal representing a logical difference obtained from a difference between the signals G and F. The length of the signal I, i.e., its width, indicates the extent of the leftward movement of the object OB.

The total sum of pulses of the pulse signal E obtained per scanning line represents a number of feature points obtained within one scanning line. In the case of this embodiment, therefore, the signals H, I and E are arranged to be output from the gate pulse generating circuit 109. This arrangement may be changed to have the signals F and G output in place of the signals H and I. However, the arrangement is preferable in view of that the counters 116 and 117 can be allowed to have smaller maximum count values. Therefore, it is advantageous in terms of the size of circuit arrangement.

With the gate pulses generated in this manner, logical products are obtained from the clock pulse signal C and the signals H and I by means of the AND circuits 114 and 115 to generate signals J and K. Then, the moving extent of the object, i.e., the quantity of image shake can be measured by counting the number of pulses of them.

In the case of FIG. 10(c), the object does not much move and the pulse width of the binary signal becomes narrower with the lapse of time. The length of periods of time t5 and t6 represent information on a moving degree. This information is also sufficiently extractable as the subtracter 119 is arranged to obtain a difference between pulse count values.

The image movement taking place on the image sensing plane can be more finely and minutely detected by changing the frequency dividing ratio of the frequency divider 112 to make the clock signal frequency higher. In other words, the detection sensitivity of the device can be increased by adjusting the frequency dividing ratio of the frequency divider 112. Further, the image shake detection sensitivity can be lowered by lowering the clock signal frequency. In case that only a part of the image is moving, any faulty action that might result from mistaking the local movement for shaking of the whole image plane can be prevented by lowering the detection sensitivity for the moving part in the above-stated manner.

The frequency dividing ratio setting circuit 113 is, therefore, arranged to set the frequency dividing ratio of the frequency divider 112 and to be capable of changing the clock signal frequency during the scanning process. By this, the detection sensitivity of the device can be increased or decreased for different parts of the image sensing plane.

For example, in taking a picture of an image including a local movement, like a tail wagging dog, with the invented device applied to a video camera which is equipped with an image stabilizing device, the image shake detecting device is preferably arranged not to detect the wagging tail of the dog as it is not an image shake.

In that respect, this embodiment is arranged to meet the above-stated requirement in the following manner: The image position of the main object, or the dog, is detected by some method. The shake detection sensitivity is increased by increasing the clock signal frequency for the areas of the image sensing plane other than the area having the image of the dog and is decreased by lowering the clock signal frequency near the image of the dog. Further, as regards the degree to which the detection sensitivity is to be changed, the sensitivity is preferably arranged to gradually vary by a plurality of steps in view of a possible error in automatically recognizing the image position of the tail of the dog and that the shading of the tail exists in the vicinity of the dog's image. This enables the camera to stably operate.

The above-stated arrangement for changing the detection sensitivity either continuously or stepwise by changing the clock signal frequency represents a feature of the detection method of the present invention.

The position of the area having a local and partial image movement within an object's image on the image sensing plane, such as the image of the dog, is arranged to be detectable jointly by means of the area designation circuit 124, the binary coding circuit 125, the delay circuit 126 and the comparison circuit 127.

Figures 13A, 13B:
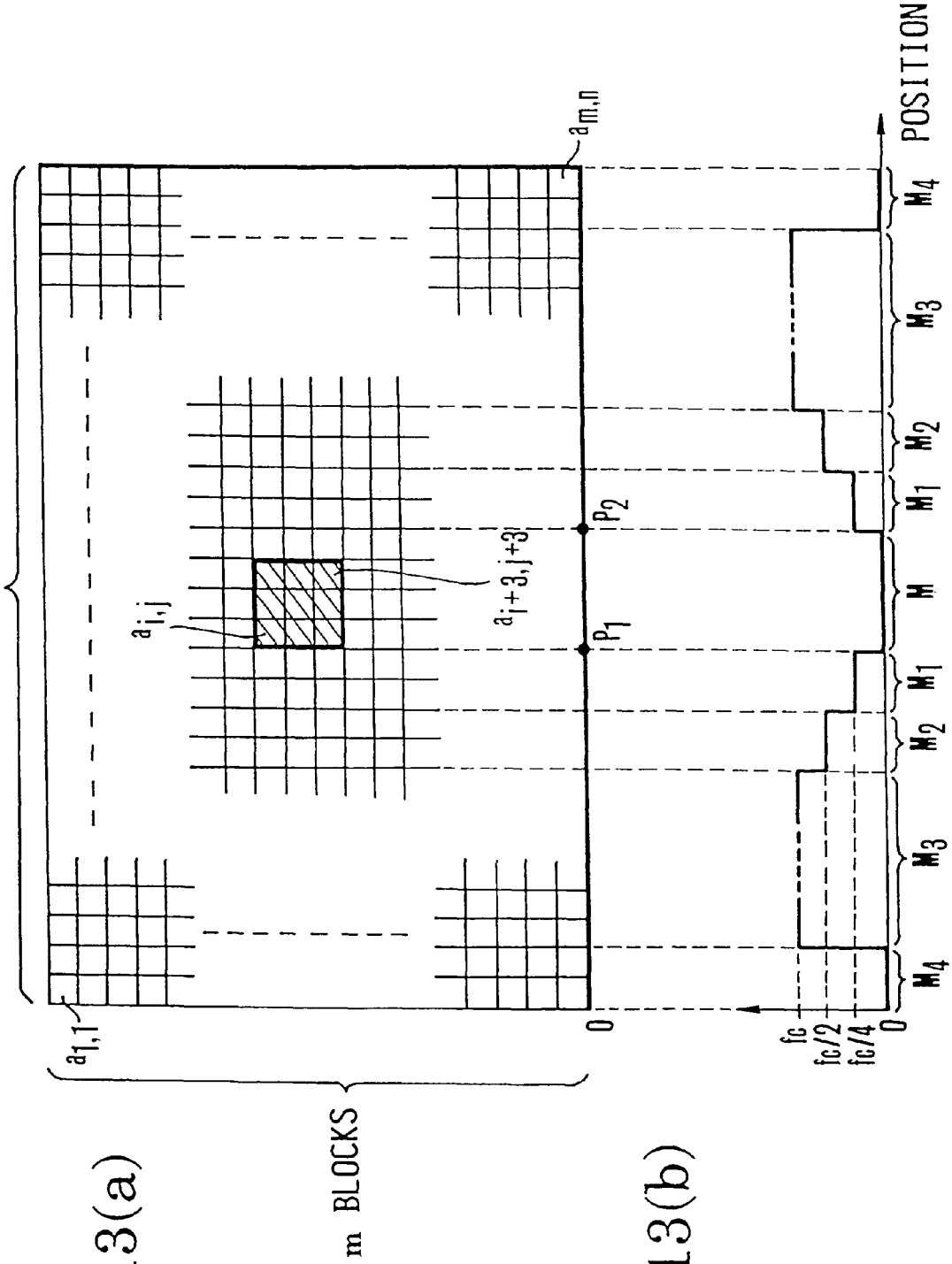
FIGS. 13(a) and 13(b) show an arrangement for detecting an area in which a movement occurred within an image sensing plane and control over the shake detecting sensitivity.

FIG. 13(a) shows an image movement area on the image sensing plane which is divided into m×n blocks. The comparison circuit 127 is arranged to supply information on a horizontal movement area including, for example, data P1 and P2 for left and light positions in the horizontal direction of a movement area M.

FIG. 13(b) shows a shake detection sensitivity distribution for the movement area M, an area round the area M and an area located further away from the area M. The axis of abscissa shows the position coordinate for each block corresponding to the horizontal direction of the image sensing plane. The axis of ordinate shows the clock signal frequency for shake detection.

Referring to FIG. 13(a), for each of the m×n blocks set on the image plane, the luminance level of the image signal output from the signal processing circuit 104 is binary converted. The current image plane is compared by the comparison circuit 127 with an image plane which is previously obtained and delayed for one field period by the delay circuit 126. The position on the image plane of any block that shows some change in information is detected by this comparison. Then, the position of any partial movement locally occurred on the image plane is detected by this and is produced as the movement area information P.

Assuming that the m×n blocks are expressed as ai, j and that a total of 16 areas ai, j (i=0 to 3; j=0 to 3) on the image plane are detected as the movement area M having some movement occurred there, the part of the image plane having the movement area M are set to be a non-detection area by causing the frequency of the clock pulse signal for detecting the quantity of shake to become zero. Since other areas near movement area M tend to be affected by the movement, the detection sensitivity is not immediately raised for the nearby areas. In the case of this embodiment, the image shake detection sensitivity is increased by raising the clock signal frequency stepwise for other areas according as they are located further away from the movement area M. These other areas include nearby areas M1 which have a width corresponding to two blocks, areas M2 which are located on the outside of the areas M1 and have a width corresponding to two blocks and areas M3 which are located on the outsides of the areas M2. The clock signal frequency is arranged to be raised accordingly as the distance of other areas from the movement area M increases. Assuming that the clock signal frequency for the area M3 for which the embodiment is arranged to have a maximum shake detection sensitivity is fc, the clock signal frequency is arranged to become fc/2 (½ sensitivity) for the area M2, fc/4 (¼ sensitivity) for the area M1 and zero for the movement area M.

This arrangement enables the device to detect the position of any local movement occurred within the image sensing plane, to detect an image shake from an area having no local image movement and to compensate for the image shake thus detected.

Further, there are areas M4 each of which has a width corresponding to two blocks and is located outermost on the image sensing plane are arranged to be non-detection areas for the purpose of preventing a detection error, an adverse effect of the shading of an object's image, etc. as mentioned in the foregoing.

While the embodiment has been described in the foregoing as arranged to detect an area having a movement in the horizontal direction, an area having a movement in the vertical direction of course can be detected in exactly the same manner.

According to the foregoing description, the detection sensitivity is arranged to be changed at every two blocks located away from the movement area. However, the sensitivity changing number of blocks is of course not limited to two blocks but can be changed to any number that is considered suitable according to the total number of blocks arranged on the image sensing plane.

Further, the above-stated stepwise detection sensitivity adjusting arrangement may be changed to a continuous adjusting arrangement.

In order to ensure that the image shake detecting device is capable of coping with any conceivable type of change taking place in the image pattern, the device must be arranged to be capable of operating without making any error even under such conditions that are as shown in FIGS. 11(a) to 11(c).

FIG. 11(a) shows a case where an object pattern which existed in a previous field 1 a given period before has disappeared and no longer exists in a current field 2. FIG. 11(b) shows another case where two object patterns existed in the previous field 1 have overlapped to appear as one pattern in the current field 2. FIG. 11(c) shows a further case where a large shake brings one object pattern closer to another object pattern. In order to ensure an accurate operation even under these conditions, the device must be provided with some image pattern discriminating means in addition to the circuit arrangement which has been described in the foregoing.

In respect to this problem, errors can be prevented by having the discriminating means which is capable of discriminating the above-stated conditions arranged to inhibit the device from obtaining any data under the above-stated conditions.

To carry out this discrimination method, the device is arranged, for example, as follows: Under the conditions shown in FIGS. 11(a) and 11(b), the number of pulses of the pulse signal E existing within the pulse signal D which is the logical sum of the signals A and B shown in FIGS. 9, and 10(a) to 10(c) is counted. In cases where the object patterns do not much deviate relative to their size and thus can be completely correlated with each other as shown in FIGS. 10(a) to 10(c), the number of signal pulses E (the logical product of the signals A and B) which are within each signal pulse D (the logical sum of the signals A and B) is always one. Whereas, in the case of FIGS. 11(a) and 11(b), the above-stated number of pulses is zero and two or more than 2 respectively. Therefore, the above-stated discriminating means which counts the number of the signal pulses E is arranged to determine the data to be valid only when the counted number is one, because, in that case, the two fields are correlatable with respect to the featuring point. The data is determined to be invalid in all other cases. Further, under the condition of FIG. 11(c), the discriminating means examines the signal A or the signal B for the size of the image pattern and decides not to handle any image pattern that is smaller than the maximum measuring value of image shaking. This arrangement prevents the device from making an error.

The values of constants to be employed in actually making compensation for image shaking are as follows: In a case where an image shake results from shaking of the camera, the upper limit of the image shake to be compensated for is set at about ±25% of the image plane with the degree of compensation set at about ⅕ to 16 of the actually detected quantity of shake.

Further, the gate pulse generating circuit 109 can be composed of a logic circuit of TTL or the like. The circuit 109 thus can be simply arranged and integrated in a compact shape. The logic of the gate pulse generating circuit 109 of this invention is not limited to the logic employed in this embodiment.

In the case of the embodiment described, the device is arranged to detect an image shake movement in the horizontal direction of the image plane during the process of one field scanning. The number of data samples is increased for higher accuracy accordingly as the number of object patterns (or feature points) within the image plane increases. The image shake detection is theoretically possible with only one horizontal scanning line. Therefore, a unidirectional shake detecting operation can be accomplished by using a one-dimensional CCD (a line sensor) instead of the two-dimensional CCD.

Next, the following describes a method for detecting an image shake in the vertical direction: There is no vertical scanning line for a video signal. Therefore, in this case, the foregoing description which is given with reference to FIGS. 10(a) to 10(c) does not apply as it is. Therefore, the embodiment is provided with a device for forming a luminance signal in the vertical direction in a manner as described below:

FIGS. 12(a) to 12(f) show by way of example a manner in which this method is carried out. The detection is arranged to be made in the vertical direction of the image plane as indicated by a vertical line in FIG. 12(f). A point at which a vertical image shake is to be detected from a video signal shown in FIG. 12(a) is determined on the detection line within the image plane. A period of time t10 required before arrival at this point is obtained from the horizontal synchronizing pulse. Then, a train of pulses are generated on the basis of this value after the lapse of the time t10 from the horizontal synchronizing pulse at every horizontal scanning process as shown in FIG. 12(b). A luminance signal is taken in from a video signal obtained between the pulses. Any change in the height or level of the pulse train as shown in FIG. 12(c) indicates a change of luminance taking place in the vertical direction. The height is sampled and held to obtain a signal wave form as shown in FIG. 12(d). Then, a binary conversion process or the like is applied to this signal wave form to extract thereby a feature point in the same manner as in the case of horizontal detecting action. This arrangement permits use of the detection circuit described in the foregoing. With respect to the method for extracting the feature point, the detection sensitivity can be enhanced by obtaining the zero crossing point of a secondary differential signal instead of the use of the binary edge.

The device embodying the invented method by the above-stated arrangement can be formed with ordinary elements such as a TTL, a C-MOS, etc. The number of gates required is relatively few to permit integration without difficulty. The device, therefore, can be arranged at a low cost. With the device used for a compact video camera, it permits reduction in size and cost compared with the conventional stabilizing type camera.

As mentioned in the foregoing, the image shake detecting device according to this invention is arranged to be capable of measuring the deviation of feature points occurred within each image plane during a scanning process on the image planes which are obtained at different time points; to detect a quantity of image shake from the measured value thus obtained; and to have its detecting sensitivity arranged to be variable. The device is, therefore, capable of accurately making a discrimination between a shake of the whole image plane and a partial image movement locally occurring within the image plane, so that compensation for an image shake can be always most appositely carried out.

The computing operation for finding the quantity of an image shake can be briefly carried out during the vertical blanking period, so that the processes of the embodiment can be carried out almost in real time.

Since the operating principle of the device does not require the use of A/D converter, a large storing and a large computing area, the embodiment permits simplification of the structural arrangement and reduction in size, weight and cost.

In the case of the embodiment described, the invention is applied to an image stabilizing type camera, the invention is of course not limited to the camera of that type. The invention permits a wide ranged applications including, for example, an image recognition device for industrial robots and an image sensing system for industrial image measuring instruments.

FIGS. 14 to 19 show a fifth embodiment of the invention. The fifth embodiment relates to improvement in the control part of a photo-taking optical system to be controlled by the image shake detecting device according to the invention. The embodiment improves the stability and response characteristic of the control part in controlling the photo-taking optical system on the basis of the result of image shake detection.

Figure 14:
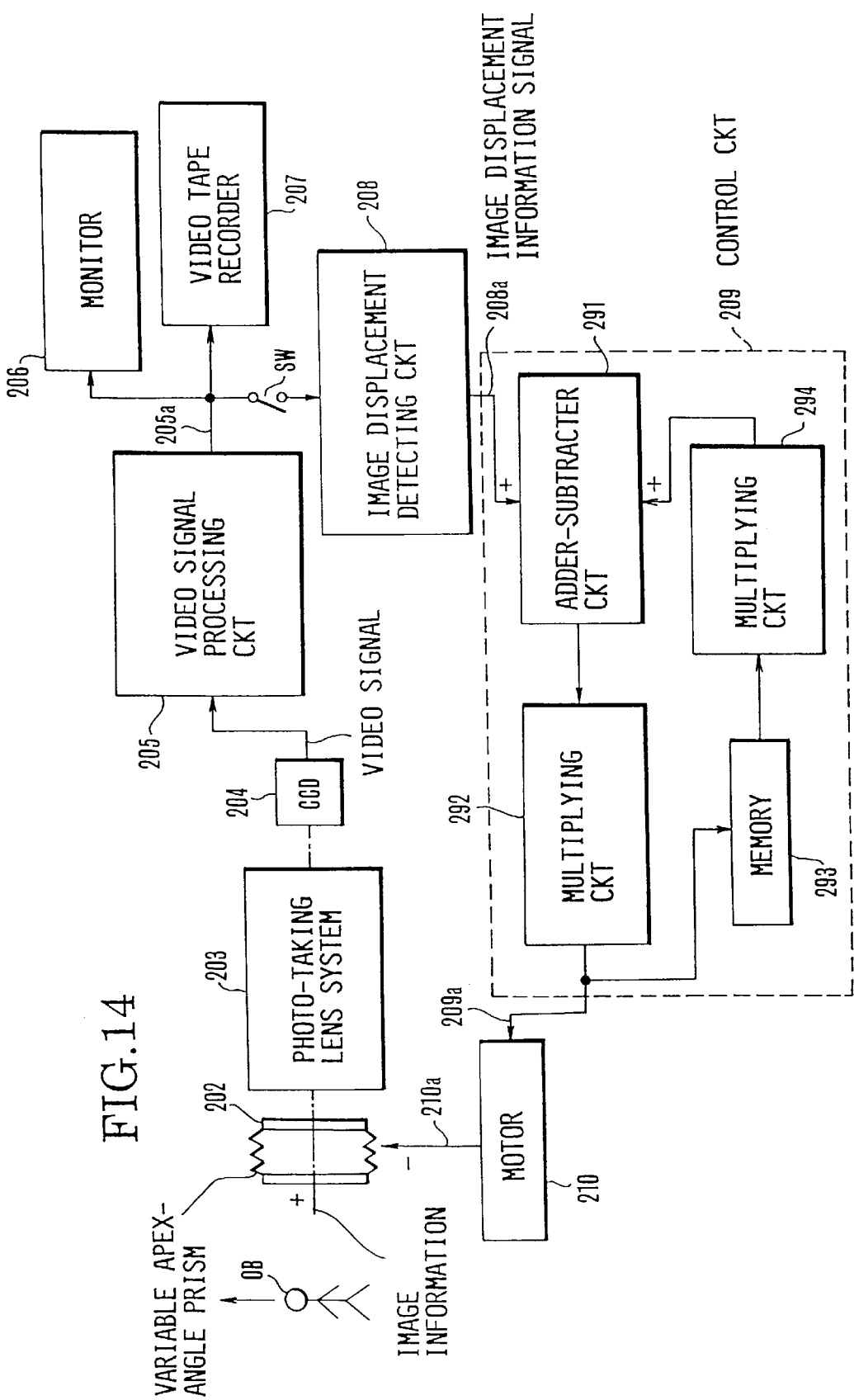
FIG. 14 is a block diagram showing a control device of an image sensing optical system arranged according to this invention as a fifth embodiment thereof.

The details of the fifth embodiment are as described below with reference to FIGS. 14 to 19:

FIG. 14 is a block diagram showing the fifth embodiment as in a state of being applied to the image stabilizing and object-tracing device of a TV camera. The illustration includes an object OB; a variable apex-angle prism 202; a photo-taking lens system 203; an image sensor 204 which is a CCD or the like and is arranged to produce an electrical signal by photo-electric converting image information formed on the image sensing plane thereof by the photo-taking lens system 203; a video signal processing circuit 205 which is arranged to perform a signal processing action on the image signal output from the image sensor 204 including gamma correction, a blanking process, addition of synchronizing signals, etc. and to produce a video signal 205a which is in conformity with the NTSC system; a monitor 206 which is, for example, an electronic viewfinder or the like; an image recording apparatus 207 which is, for example, a video tape recorder; an image displacement detecting circuit 208 which is arranged to detect a shaking or moving state of an image formed on the image sensing plane of the image sensor 204; and an image displacement information signal 208a which is output from the image displacement detecting circuit 208.

Figure 15:
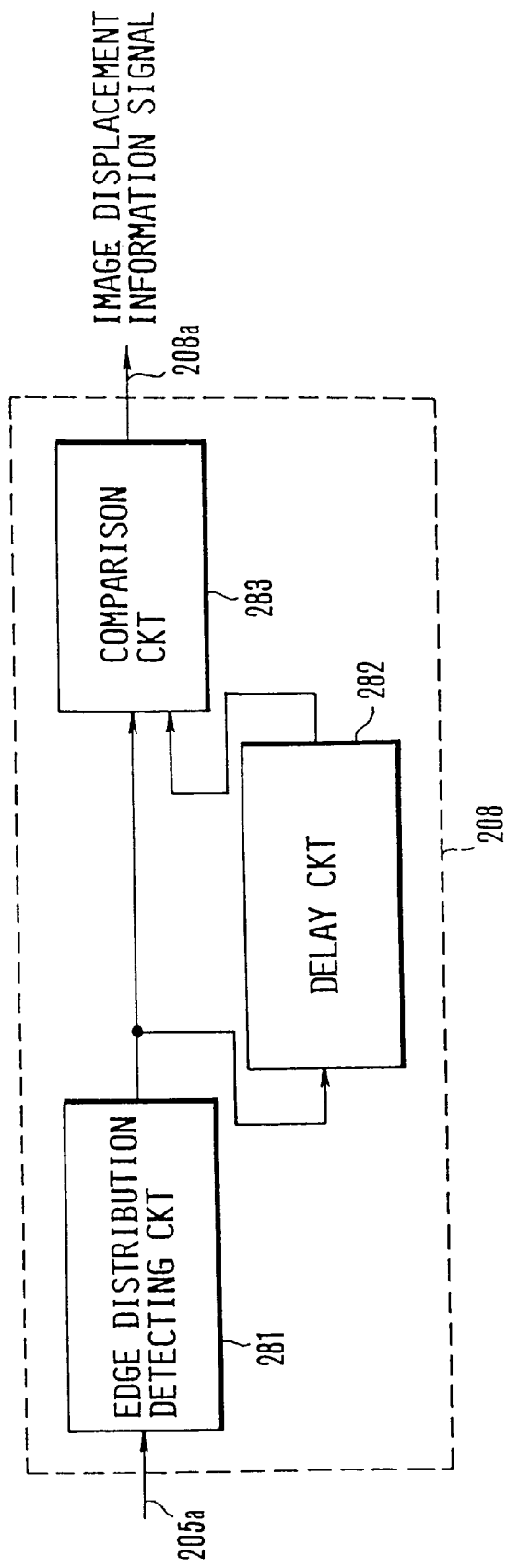
FIG. 15 is a block diagram showing an essential part of the fifth embodiment shown in FIG. 14.

The image displacement detecting circuit 208 compares, for example, the edge position of the image or the position of its center of gravity always with that of an immediately preceding image plane and computes and finds a change in that position while one image plane (one field) is being transmitted. Since the process is performed by means of electric circuits, the result of computation is produced almost concurrently with the end of the transmission. FIG. 15 shows by way of example the internal arrangement of the image displacement detecting circuit 208 which is arranged to detect the edge distribution states of an object's image appearing on a plurality of (two) image planes obtained at different times and to detect any image movement through a change or difference found between the two image planes.

Referring to FIG. 15, within the image displacement detecting circuit 208: An edge distribution detecting circuit 281 is arranged to detect the edge distribution state of the object's image existing on the image sensing plane through the image signal 205a produced from the video signal processing circuit 205. A feature of the object's image is detected, for example, from the number of edges distributed in a predetermined direction which is the vertical or horizontal direction. A delay circuit 282 is arranged to store an amount of detection information which corresponds to one image plane (or one field) and is produced from the edge distribution detection circuit 281; and to produce the information by delaying it for the period of one field. A comparison circuit 283 compares edge distribution information which is output and received directly from the edge distribution detection circuit 281 with the previous edge distribution information which is received through the delay circuit 282. The circuit 283 is thus arranged to produce the image displacement information signal 208a which indicates the quantity and direction of image displacement.

The feature of the image plane is thus detected from the edge distribution on the image plane. The detected feature of the image plane of every current field is compared with that of the immediately preceding field. Any positional change, i.e. shaking of the image or movement of the object which has occurred during the period of one field is thus detected. The shake detection information corresponding to the positional change of the image thus can be produced in a cycle of one field.

In FIG. 14, a reference numeral 209 denotes a control circuit. The control circuit 209 is arranged to produce a control signal 209a for controlling the variable apex-angle prism 202 on the basis of the image displacement information signal 208a. FIG. 14 further shows an adder-subtracter circuit 291 which is arranged to receive the signal 208a output from the image displacement detecting circuit 208 and to add it to (or subtract it from) the feedback output of the multiplying circuit 294. There is provided another multiplying circuit 292 which is arranged to multiply the output of the adder-subtracter circuit 291 by a given coefficient and to produce and supply a control signal to a motor 210 which is provided for driving the variable apex-angle prism 202. A memory 293 is arranged to store the control information which is supplied from the multiplying circuit 292 to the motor 210. Further, the memory 293 is arranged to produce the input control information 209a after the lapse of a period of two fields in the order of input. In other words, the memory 292 operates on the basis of FIFO (first-in/first-out). The multiplying circuit 294 is arranged to multiply the information stored at the memory 293 by a given coefficient and to feed the result of multiplication back to the adder-subtracter circuit 291.

The variable apex-angle prism driving motor 210 is arranged to change the apex angle of the variable apex-angle prism 202 by driving the prism according to the control signal 209a output from the control circuit 209. The motor 210 is controlled to cause the prism 202 to trace an image displacement or shaking movement from the preceding image plane and to offset the image displacement.

Between the video signal processing circuit 205 and the image displacement detection circuit 208, there is provided a switch SW for selection between execution and nonexecution of the tracing action. When the switch SW opens, the control system which controls the prism 202 ceases to operate to bring about a mode of not tracing the image shake or displacement and not making compensation for the image displacement.

The control system for the image sensing optical device which is arranged according to this invention as described above operates as described in sequence below:

When an object to be photographed moves relative to the TV camera due to a camera shake or the like, a change is brought about in the object's image on the image sensing plane of the image sensor 204 through the prism 202 and the photo-taking lens system 203. With the image converted into an electrical signal, the change appears in the output 205a of the video signal processing circuit 205. The output 205a of the video signal processing circuit 205 is supplied to the monitor 206 which is an electronic viewfinder or the like as well as to the video tape recorder 207. The image thus can be recorded while monitoring it through the viewfinder.

The signal 205a output from the video signal processing circuit 205 is supplied also to the image displacement detecting circuit 208. At the circuit 208 which is arranged as shown in FIG. 15, the moving quantity of the object OB is detected through computation. As a result, an image displacement detection signal 208a is supplied to the control circuit 209.

The control circuit 209 is provided with information on the position of the object's image obtained at least in the vertical or horizontal direction of the image sensing plane. In accordance with the information, the control circuit 209 causes the motor 210 to rotate in the direction of lessening the change which results from the positional change of the object's image and is appearing in the signal 205a output from the video signal processing circuit 205. The angle of the variable apex-angle prism 202 is thus changed by the rotation of the motor 210. In other words, the optical axis of the prism 202 is adjusted in the direction in which the image has moved in such a way as to trace (track) the object. This feedback control is repeatedly performed in synchronism with a cycle set at a value an integer times as much as the sampling period of the image sensor 204, which is 1/60 sec (one field period). However, for a high-speed image displacement tracing characteristic, the integer is preferably set at 1.

Next, the control sequence of the invention is described in comparison with the conventional control system as follows: Considered in reference to the arrangement shown in FIG. 14, the conventional device is arranged to supply the image displacement information signal 208a of the image displacement detecting circuit 208 directly to the multiplying circuit 292. The conventional device is not provided with the multiplying circuit 294 and the memory 293.

Figure 16:
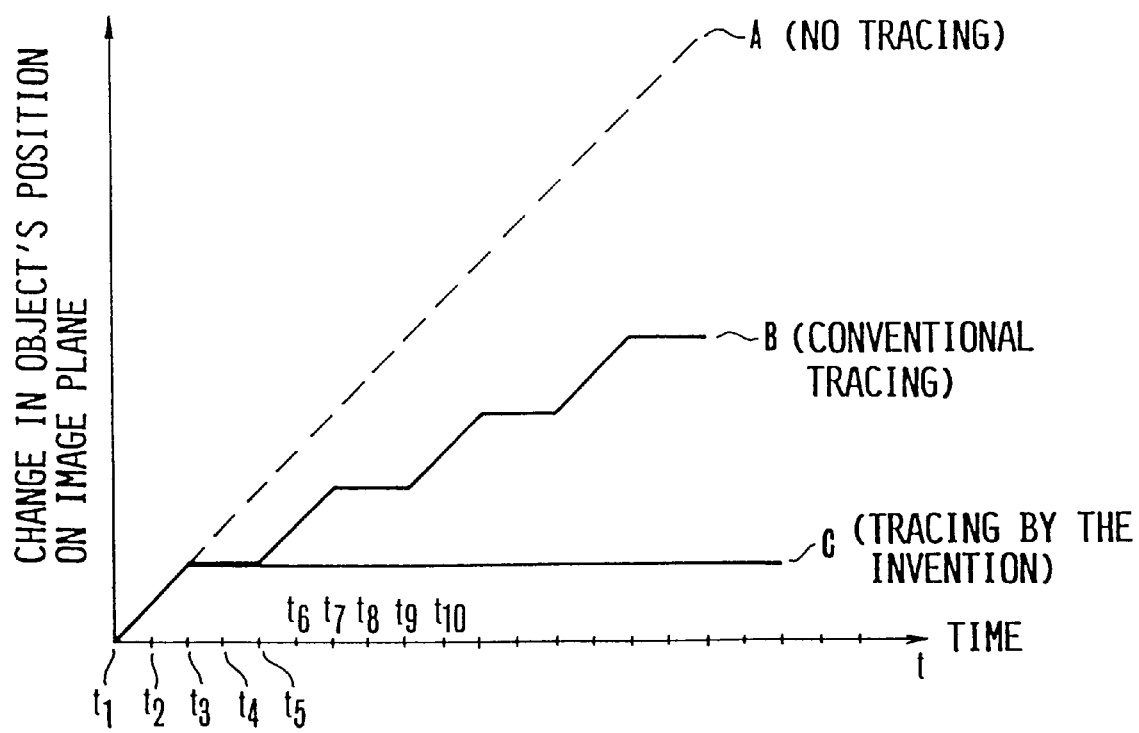
FIG. 16 is a graph showing the tracing characteristic of the same control device.

Whereas, the device according to this invention is provided with the adder-subtrater circuit 291, the multiplying circuit 294 and the memory 293. This difference from the conventional device enables the invented device to carry out a control algorithm as follows:

FIG. 16 is a graphic representation in time series of the operation of tracing the positional change of the object's image. In FIG. 16, the axis of abscissa shows the period of time lapsing from commencement of object tracing, that is, the start of an image shake compensating action. The time is graduated in units of field. The axis of ordinate shows the position of the object OB as reduced to the image signal 205a. Each of reference symbols t1, t2, - - - denotes a point of time indicating one field.

Let us now assume that an object's movement causes its image on the image sensing plane to move at a constant speed in one direction.

Again referring to FIG. 16, a reference symbol A denotes the locus of the object movement appearing on the image sensing plane while no tracing action is performed for the movement. The locus shows that the position of the object OB gradually changes and deviates on the image plane according as time elapses.

A symbol B denotes an object tracing action performed by the image shake and object tracing device of the conventional TV camera. The conventional device can be regarded as being arranged to supply the output of the image displacement detecting circuit 208 of FIG. 14 directly to the multiplying circuit 292 without having the adder-subtracter circuit 291, the memory 293 and the multiplying circuit 294.

Another symbol C denotes the locus of object movement obtained with an object tracing action performed by the circuit of the embodiment shown in FIG. 14.

The object tracing action of the conventional device is first described as follows: The coefficient to be used by the multiplying circuit 292 is assumed to be "1". The motor 210 is assumed to rotate at a speed proportional to an input voltage and to have its output transmitted without delay. Assuming that the object tracing action begins at the point of time t1, images obtained by the image sensor 204 at the points of time t1 and t2 require about one field period for transmission. Information on any object image displacement output from the image displacement detecting circuit 208 as a result of comparison of these images is obtained at the point of time t3. The motor 210 begins to be driven in accordance with the value of this information. The motor 210 then acts to drive the variable apex-angle prism 202 in such a way as to make compensation for the positional change of the object. During a period of time between time points t3 and t4, the object image appears to be in repose on the image plane. The result of image comparison made at the time points t2 and t3 is obtained at the time point t4. Therefore, the object image is in repose and does not change also during a period between the time points t4 and t5. In other words, with the motor 210 driven on the basis of the moving degree of the object image detected between the time points t1 and t3, the position of the object OB on the image sensing plane remains unchanged during a period between the time points t3 and t5. When the images taken in by the image sensor 204 are compared with each other at the time points t3 and t4, the result of comparison is zero. Then, with this value obtained at the point of time t5, the image is considered to have settled in a position and the rotation of the motor 210 is brought to a stop at this point of time t5, despite of the actual movement of the object OB continuing as represented by the locus A. As a result, the position of the object image on the image sensing plane again comes to change at the time point t5. This displacement is detected between time points t5 and t6 and between time points t6 and t7. Then, the motor 210 is again driven at a time point t7 to make the image position of the object OB unvarying on the image sensing plane. In accordance with the conventional control method, the above-stated phenomenon is thus repeated at every two field periods. The object position on the image sensing plane varies stepwise with time and never gives a fixed value.

The tracing accuracy or the image stabilizing efficiency can be expressed as follows:

> Image stabilizing efficiency=object position change on the image plane obtained with a tracing action/object position change on the image plane without a tracing action According to this, the image stabilizing efficiency of the conventional control method is only about ½.

Further, an attempt to enhance the image stabilizing efficiency by increasing the multiplier of the multiplying circuit to a value larger than "1" tends to bring about oscillations. To avoid this, if the outputs 210a and 209a of the motor 210 and the multiplying circuit 292 are arranged to be delayed, it degrades the response characteristic of the control system.

Meanwhile, in accordance with the invented arrangement as shown in FIG. 14, the object tracing action is performed with the switch SW closed in the following manner: The memory 293 is arranged to always store the control information 209a output from the multiplying circuit 292; and to produce information on the value of a time point at which an image corresponding to the value of the image displacement information signal 208a output from the image displacement detecting circuit 208 is taken in by the image sensor 204.

In other words, for the image displacement detection information 208a obtained at the time point t5, for example, the memory 213 is caused to produce the output control information 209a of the control circuit 209 taken in at the time point t3 when the image on which the detection information is based is sampled. At the object tracing starting time point t1, all data are initialized to become zero.

The coefficient of the multiplying circuit 292 is also set at "1" in the same manner as in the case described in the foregoing. With the object tracing action allowed to begin at the time point t1, the output of the memory 293 remains at zero from the time points t1 till the time point t3. Therefore, the tracing characteristic of the invented device coincides with that of the conventional device during a period between the time points t1 and t5.

In other words, the memory 293 has no input and remains in its initialized state at the time points t1 and t2. At the point of time t3, the image displacement information signal 208a obtained between time points t1 and t2 is supplied to the control circuit 209. This signal 208a is received by the adder-subtracter circuit 291. The output 209a of the control circuit 209 which has been multiplied an integer times by the multiplying circuit 292 is supplied to the motor 210 and, at the same time, is also supplied to and stored by the memory 293. At the ensuing time point t4, the image displacement information signal 208a obtained between the time points t2 and t3 is supplied to the control circuit 209 to be supplied to the motor 210 and the memory 293 via the adder-subtracter circuit 291 and the multiplying circuit 292. Meanwhile, the control information 209a obtained at the time point t3 has already been stored at the memory 293 and is still retained within the memory 293 at the time point t4. Therefore, at the time point t4, the output of the memory 293 is zero as yet. Until the next time points t5, the object tracing characteristic of the invented device coincides with the object tracing characteristic B of the conventional control device.

However, when the image displacement information signal 208a which is obtained from between the images taken in by the image sensor 204 respectively at the time points t4 and t5 is output from the image displacement detection circuit 208 at the time point t5, the control information 209a is supplied to the motor 210 via the adder-subtracter circuit 291 and the multiplying circuit 292 disposed within the control circuit 209. This information signal 209a then controls and causes the motor 210 to rotate in the direction of lessening the image displacement. At the same time, the control information 209a is also supplied to and stored by the memory 293. Meanwhile, the previous control information 209a which has been stored at the time point t3 preceding by two field periods is output from the memory 293 and is multiplied by an integer-times (×1) by the multiplying circuit 294 and is supplied to the adder-subtracter circuit 291. The control information 209a supplied at the time point tS is obtained by adding the multiplied value to the image displacement information signal 208a. This allows the motor 210 to continuously operate between the time points t5 and t6 on the basis of the control information 209a obtained at the time point t3 even if the value of the image displacement information signal 208a becomes zero because of no change in the image information at the time points t3 and t4 as a result of the control action performed on the variable apex-angle prism 202 by driving the motor 210 at the time point t3. Unlike the tracing characteristic of the conventional control device which allows positional deviation from the object OB to increase again, the invented device constantly performs the tracing action without such increase in the positional deviation even after the time point t5 as indicated by the characteristic curve C in FIG. 16 as long as the control is within the operation range of the variable apex-angle prism 202. In other words, the invented device enables the TV camera to perfectly trace an object which moves relative to the camera.

The embodiment enhances the object tracing efficiency, because: In view of the fact that the value of the image displacement information signal 208a of the image displacement detecting circuit 208 which is dispersively obtained timewise through the operation described in the foregoing involves a time delay, the control circuit 209 is arranged to detect the quantity of image compensation made at the time point when the value of the signal 208a is sampled; and to prepare a next control instruction by adjusting the overplus or deficiency of the quantity of compensation.

Figure 17:
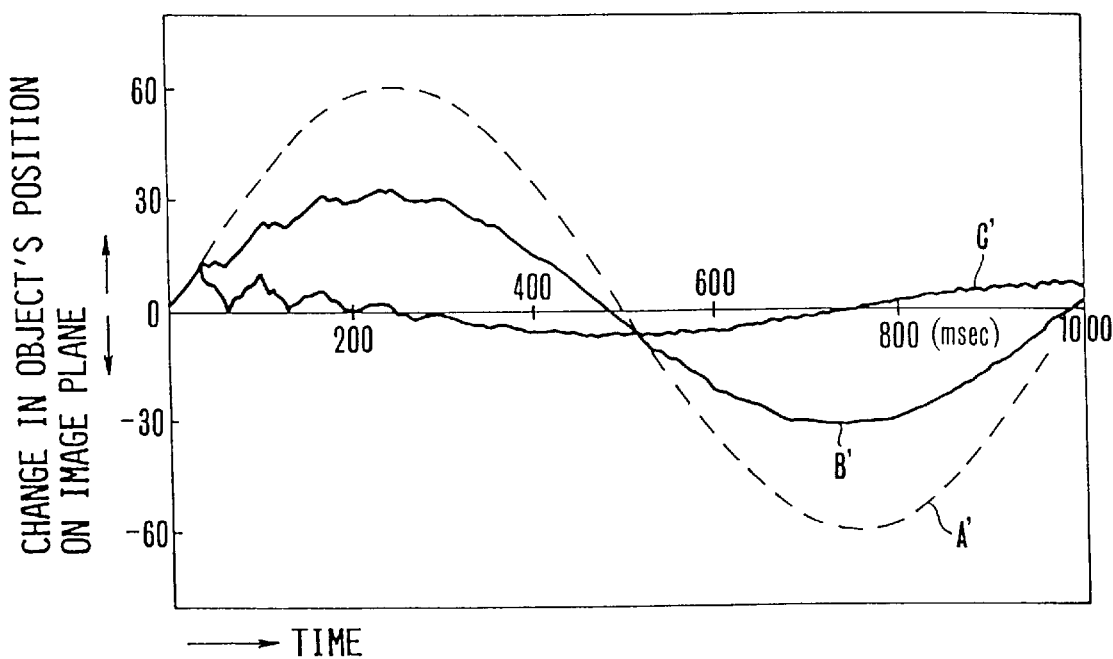
FIG. 17 is a graph showing the result of a simulation of the tracing action of the invented control device obtained with the device actually applied to a feedback control system.

Next, in a case where the moving speed of an object changes while its image is displaced either by the movement of the camera resulting from a camera shake or the like or by a movement of the object and that the displacing quantity of the motor 210 is affected by inertia or viscosity, the image sensing optical device according to this invention operates as described below:

FIG. 17 shows the result of simulation performed by a computer with the movement of the object OB assumed to be a sine curve having a frequency of 1 Hz and an amplitude corresponding to 60 picture elements and the displacing quantity 210a of the motor 210 to be a transmission function of a secondary delay system considering it to be of a transient characteristic. To obtain a step response C(t), the following formula is used for the simulation:

$$C(t) = L^{-1}\left(\frac{K}{S\{1 + 2\zeta(S/\omega n) + (S/\omega n)^2\}}\right)$$

wherein $\zeta$ represents an attenuation coefficient and $\omega n$ a natural angular frequency.

In case that $\zeta > 1$, the step response C(t) is expressed as follows:

$$C(t) = K\left(1 - \frac{1}{2\sqrt{\zeta^2 - 1}}\left\{(\zeta + \sqrt{\zeta^2 - 1})e^{-t\omega n(\zeta - \sqrt{\zeta^2 - 1})} - (\zeta - \sqrt{\zeta^2 - 1})e^{-t\omega n(\zeta + \sqrt{\zeta^2 - 1})}\right\}\right)$$

In this case, $\zeta = 1.5$ and $\omega n = 2$ are substituted as values for an actual control system and one cycle (one sec) of the curve is shown in the drawing.

In FIG. 17, the axis of abscissa shows time and is graduated in units of one field. The axis of ordinate shows the changing positions of the object and is graduated in units of two picture elements. The origin represents a control starting time point. Curves indicate object tracing states, including a characteristic curves A', B' and C' which respectively correspond to the curves A, B and C of FIG. 16. Comparing the curves B' and C', one of them which is closer to the axis of abscissa and closer to a straight line represents a less degree of image shaking, less deviation from the object and a higher degree of stability and thus shows a better tracing and image stabilizing effect than the other.

The curve B' was obtained by setting the multiplier of the multiplying circuit 292 at "1.5" to lessen the amplitude. Despite of that, in the case of the curve B', the amplitude covered about ±30 picture elements and the stabilizing effect was about 0.5 thus showing unstable state of the image.

If the above-stated multiplier is set at a value above 1.5, there would arise oscillations. If it is set at a value below 1.5, the stabilizing effect would become lower. In the case of the curve C', the multipliers of the multiplying circuits 292 and 294 were set at "3". However, there occurred no oscillation and the amplitude covered only about ±10 picture elements thus showing a stable state of the image. The arrangement according to this invention gives the above-stated salient effect even by using the same frequency and the same transmission coefficient of motor as the conventional control system which does not have the memory 293 and the multiplying circuit 294.

The invented control system may be either composed of a digital circuit or an analog circuit. In the case of the analog circuit, the use of the memory 293 can be replaced with a sample-and-hold circuit or a delay element. In that case, the control circuit may be arranged to have a driving clock signal. Then, efficient control can be accomplished by synchronizing the timing of the driving clock signal with that of the CCD or the video signal.

Further, with regard to the image compensating method, the use of the variable apex-angle prism 202 may be replaced with an optical compensation method by which the position of the photo-taking lens 203 and that of the image sensor 204 is shifted in parallel perpendicularly to the optical axis. The algorithm according to this invention is applicable also to such a method.

In a case where an element such as a piezo-electric element or a voice coil that has its output displacement in proportion to its input voltage is used in place of the motor 210, an integrator must be interposed in between the control circuit 209 and the motor 210. Further, the coefficients to be used for the multiplying circuits 292 and 294 do not have to be of fixed values. One coefficient may be changed over to another according to the operating condition. It is also possible to have these circuits arranged either to raise the input to the second power or to compute a square root. Further, the coefficient of the multiplying circuit 292 and that of the multiplying circuit 294 do not have to coincide with each other. The multiplying circuit 294 may be arranged as an observer using a function modeled on the secondary delay of the motor 210. Further, in cases where the displacing quantity of the motor 210 is directly detectable, a modification which is arranged as shown in FIG. 18 is conceivable.

Figure 18:
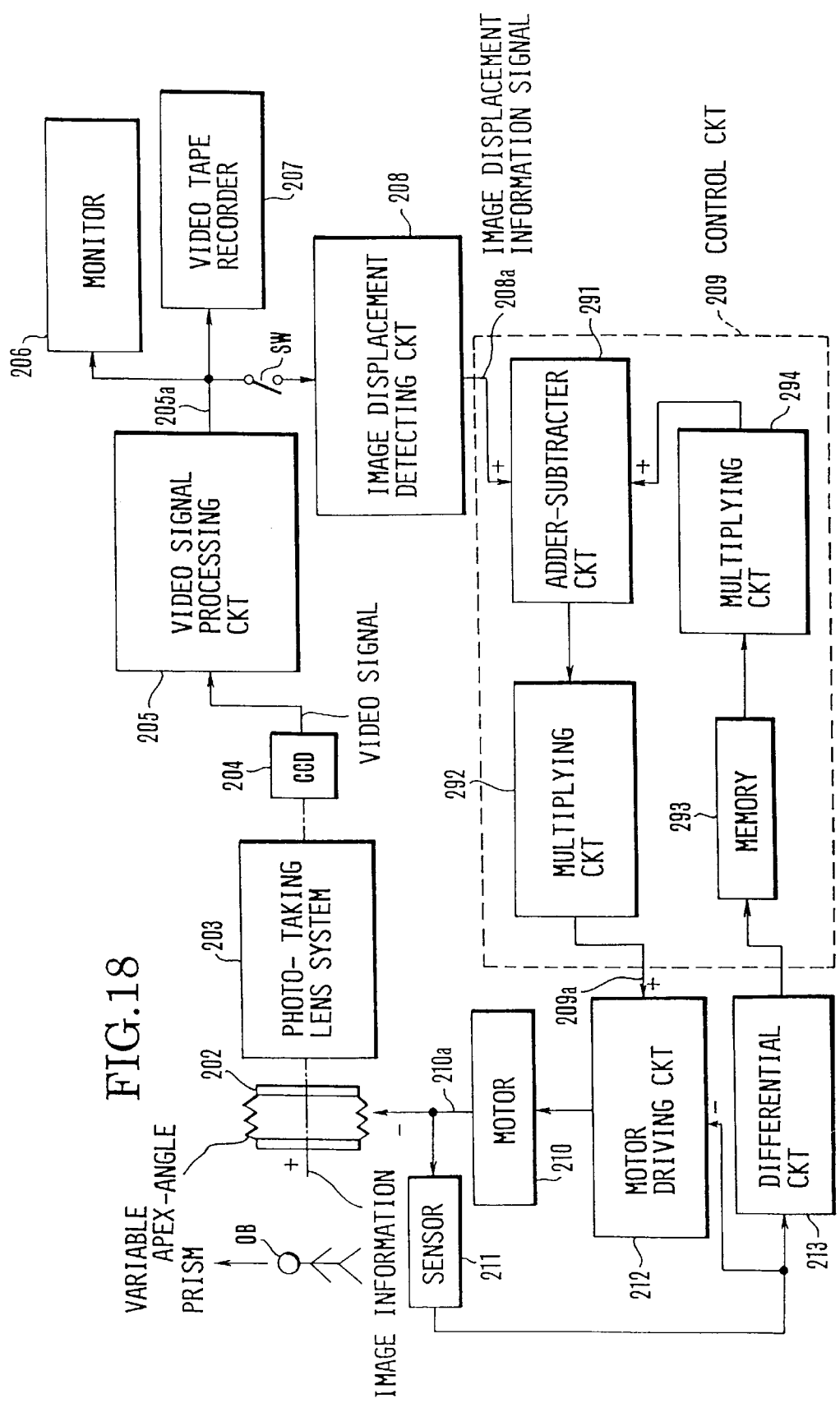
FIG. 18 is a block diagram showing a control device which is arranged according to this invention as a sixth embodiment thereof.

Referring to FIG. 18, to the arrangement of FIG. 14 are added a sensor 211 which is arranged to detect the displacing quantity of the output of the motor 210; a driving circuit 212 which is arranged to control the motor 210 in accordance with a signal output from the sensor 211; and a differential circuit 213. The motor 210, the sensor 211 and the driving circuit 212 form one closed loop control system. This control system is arranged to perform feedback control according to the control signal 209a to keep the displacing quantity 210a of the motor 210 at an apposite value. The sensor 211 directly detects the control operation quantity 210a. The value thus detected is stored by the memory 293. The computing control algorithm based on this invention then can be carried out by using the stored value as described in the foregoing. The output of the sensor 211 is position information such as length or angle. The differential circuit 213 is provided for the purpose of converting this position information into a position changing quantity of an image obtained at a point of time preceding a current image by two fields.

Figure 19:
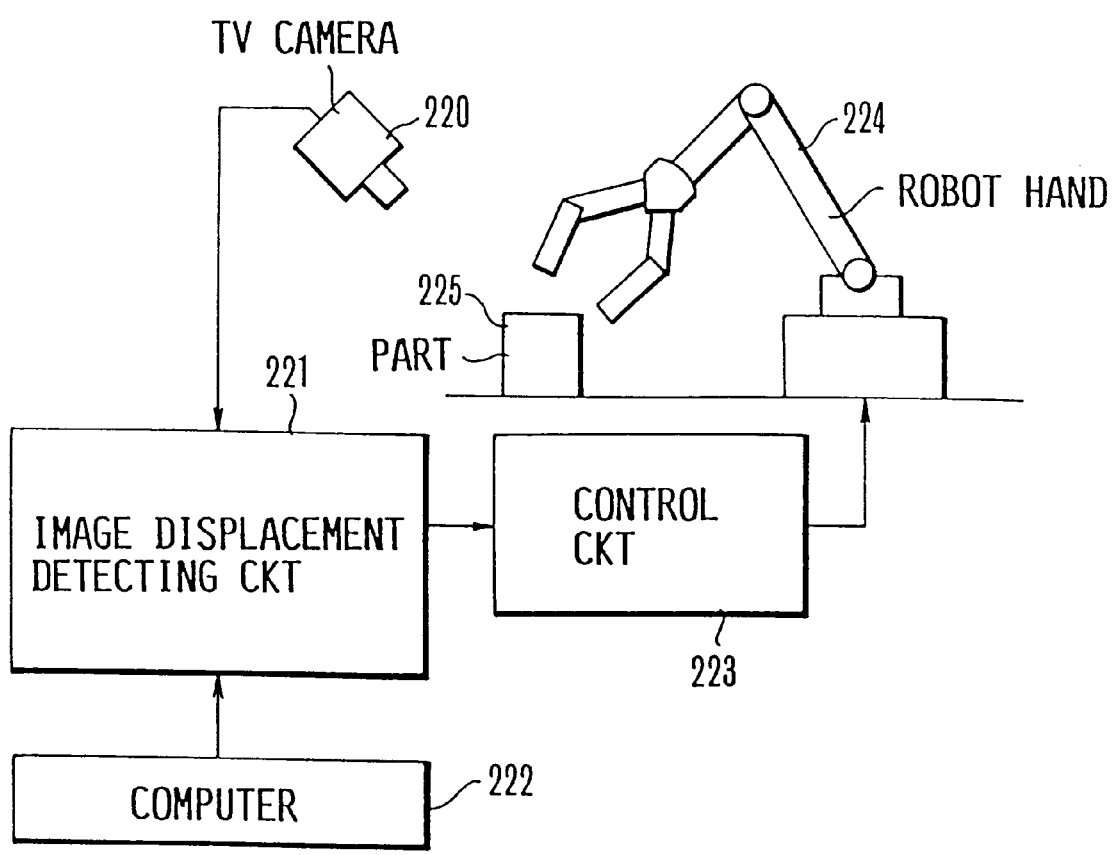
FIG. 19 is a block diagram showing a control device which is arranged as a seventh embodiment of the invention and is shown as in a state of being applied to an assembly robot.

FIG. 19 shows another application example of the invented image sensing optical device. In this case, the control device according to this invention is applied to an automatic assembly robot. This control system is shown in a block diagram. The illustration includes a TV camera 220; an image displacement detecting circuit 212 which is arranged to detect an image displacement through an image processing operation; a computer 222 which is arranged to give instructions; a control circuit 223 which incorporates the control algorithm of this invention; a robot hand 224; and a part 225 which is subjected to the assembly process. The control system operates as follows: When the computer 222 gives an instruction to detect the position of the part 225, the TV camera 220 takes in information on the position of the part 225 and that of the hand 224 in the form of an image. The image displacement detecting circuit 221 obtains by computation a difference between the instruction given by the computer 222 and the image obtained by the TV camera 220. The control circuit 223 gives a driving instruction to the robot hand 224 on the basis of the result of the computation. In this instance, a driving action is instructed to be performed in the direction of lessening the difference in image between the TV camera 220 and the instruction given by the computer 222.

Further, in each of the embodiments shown in FIGS. 14 and 18, the output 208a of the image displacement detecting circuit 208 represents a difference between the positions of the object obtained at a time interval which corresponds to one field. Whereas, in the case of the embodiment shown in FIG. 19, the output of the image displacement detecting circuit 221 is a position information. Therefore, in using the circuit arrangement of FIG. 14 or 18 for the embodiment shown in FIG. 19, it is necessary to compute a changing quantity per sampling period by providing a differential circuit before the control circuit 223.

The use of the control algorithm of the invention for this robot permits accurate positioning, work with an increased speed and feedback coefficient setting within a wider range to facilitate adjustment.

In accordance with this invention, as described in the foregoing, the control device for an image sensing optical system is arranged to compute the quantity of control operation for the feedback control system taking into consideration the sampling period required for sampling such disperse detection information as the information to be handled in controlling the image sensing system of a TV camera; and to supply the controlled system with information on the computed value. Therefore, the control output becomes very stable. Both the response characteristic and the frequency characteristic can be improved. Further, the system stabilization permits to have a wider feedback coefficient setting range. Therefore, with the invention applied to an image sensing optical system and other image processing devices of varied kinds, the image stabilizing and object tracing functions can be advantageously carried out to compensate for such image displacement that results from a movement of the object.

Further, the invented device is obtainable in a compact size as it can be arranged only with electric circuit without recourse to any additional sensor or any additional optical parts.

While this invention is applied to the feedback control system of an image sensing optical system in the case of the embodiment described above, the invention is not limited to it but is applicable to any other system that has a feedback system for controlling a controlled system on the basis of timewise dispersed detection.

FIGS. 20 to 22(c) show an eighth embodiment of this invention. In this case, the image shake detecting device arranged according to the invention is applied to an automatic tracing (tracking) type focusing device, automatic tracing type exposure control device, etc. for the purpose of setting, within an image plane, a tracing area for tracing a movement of an object occurring within the image plane.

Figure 20:
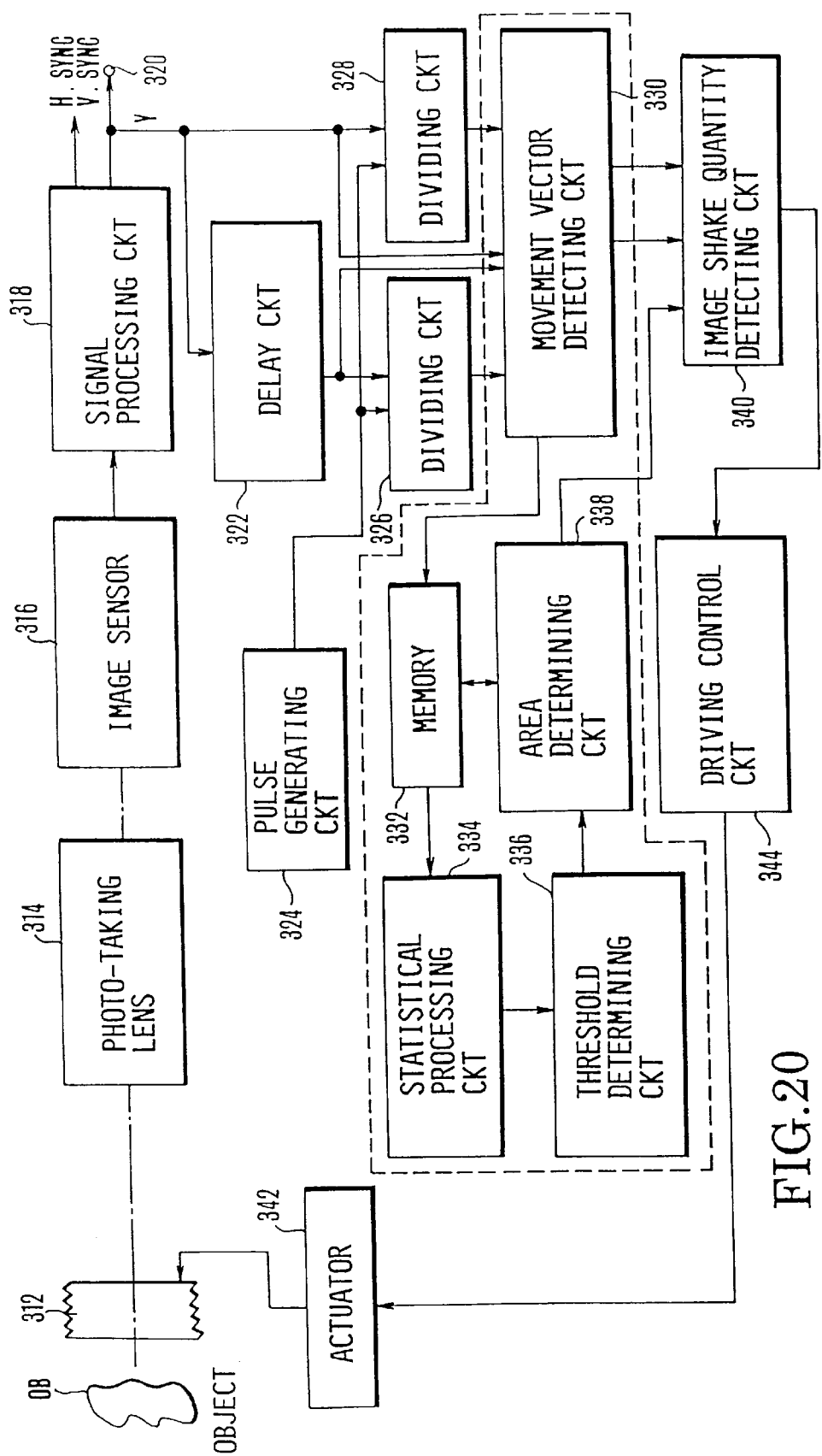
FIG. 20 is a block diagram showing the arrangement of a video camera to which the invention is applied as an eighth embodiment thereof.

The eighth embodiment is arranged to obtain movement vectors from a plurality of areas set within the image plane. An optical flow is statistically processed to determine an object tracing area and an image shake detection area. The details of the embodiment are as described below with reference to the drawings:

FIG. 20 is a block diagram showing the arrangement of a video camera which is provided with the image shake compensating device arranged according to this invention. The illustration includes an object OB; a variable apex-angle prism 312 which has a variable optical axis; a photo-taking lens 314; an image sensor 316 which is, for example, composed of a two dimensional CCD; a signal processing circuit 318 which performs a signal processing operation on an image signal output from the image sensor 316, including processes of gamma correction, blanking and addition of synchronizing signals, so that a TV signal of, for example, the NTSC system can be output from an output terminal 320; a luminance signal Y; a horizontal synchronizing signal H.SYNC: a vertical synchronizing signal V.SYNC; a delay circuit 322 which is arranged to delay the luminance signal Y for a given period of time and is composed of, for example, a field memory of the FIFO (first-in/first-out) type; a block dividing pulse generating circuit 324 which is arranged to generate a gate pulse signal for gating the video signal under a scanning process in such a way as to divide it into a given number of blocks set on the image plane; and dividing circuits 326 and 328 which divide the luminance signal Y by gating it according to the pulses output from the block dividing pulse generating circuit 324. The dividing circuits 326 and 328 are arranged to output the input luminance signal in units of the blocks set on the image plane. More specifically, each of them consists of a gate circuit which is arranged to be opened and closed by the pulses output from the block dividing pulse generating circuit 324 and a memory which is arranged to store signal parts allowed to pass the gate circuit.

Referring further to FIG. 20, a movement vector detecting circuit 330 is arranged to compare the signal of the currently obtained image plane with the signal output from the delay circuit 322 thus representing a previous image plane which precedes the current image plane by a given period of time; and to obtain a movement vector by detecting any change occurred in each of the divided blocks. A memory 332 is arranged to store the movement vector information for each part of the image plane. A statistical processing circuit 334 is arranged to prepare a histogram indicating the size and frequency of each movement vector. A threshold determining circuit 336 is arranged to recognize the shape of the histogram and to determine a threshold value which will be described later. An area determining circuit 338 is arranged to look up and find from the histogram the blocks which are within the threshold determined by the threshold determining circuit 336.

An image shake quantity detecting circuit 340 is arranged to detect the quantity of an image shake from within the luminance signal. For example, the circuit 340 is composed of a correlation computing circuit which is arranged to perform a representing point matching action. An actuator 342 is arranged to change the apex angle of the variable apex-angle prism 312. A driving control circuit 344 is arranged to drive the actuator 342 in accordance with the output of the image shake quantity detecting circuit 340. The deflection angle of the exit optical axis relative to the entrance optical axis of the prism 312 is controllable by adjusting the apex angle of the variable apex-angle prism 312.

The video camera of FIG. 20 operates as follows: An object's image which passes the variable apex-angle prism 312 and the photo-taking lens 314 comes to the image sensor 316. The image sensor 316 then produces an image signal. The signal processing circuit 318 performs the above-stated signal processing operation on the output of the image sensor 316. A luminance signal Y output from the signal processing circuit 318 is supplied directly to the dividing circuit 328 and also indirectly to the dividing circuit 326 through the delay circuit 322. The delay circuit 322 delays the luminance signal for the period of one field (about 16.7 msec) before it is supplied to the dividing circuit 326. The dividing circuits 326 and 328 are arranged to divide one whole image plane into m×n blocks in accordance with the pulses output from the block dividing pulse generating circuit 324. In this case, m is assumed to be 20 and n to be 14 to give a total of 280 blocks.

Figure 21A:
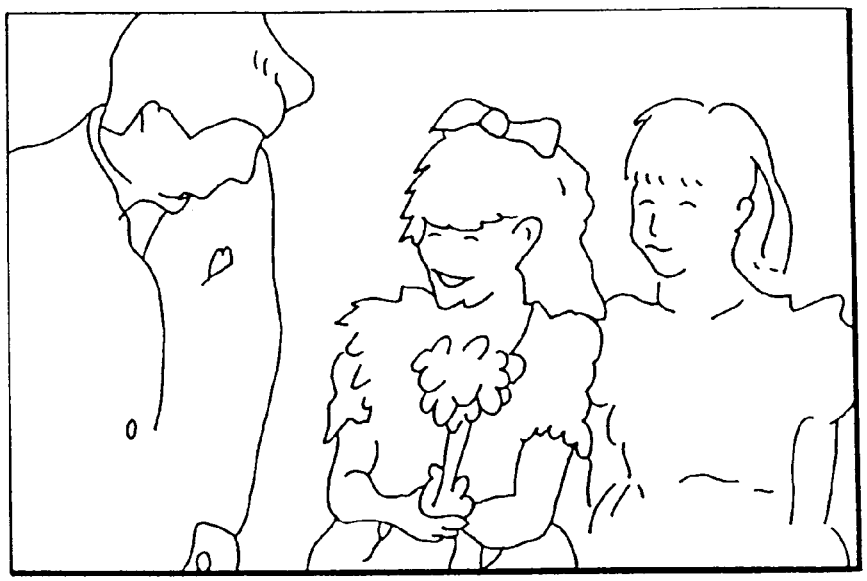
FIGS. 21(a) to 21(d) and 22(a) to 22(c) illustrate procedures to be taken by the eighth embodiment for determining areas.
Figure 21B:
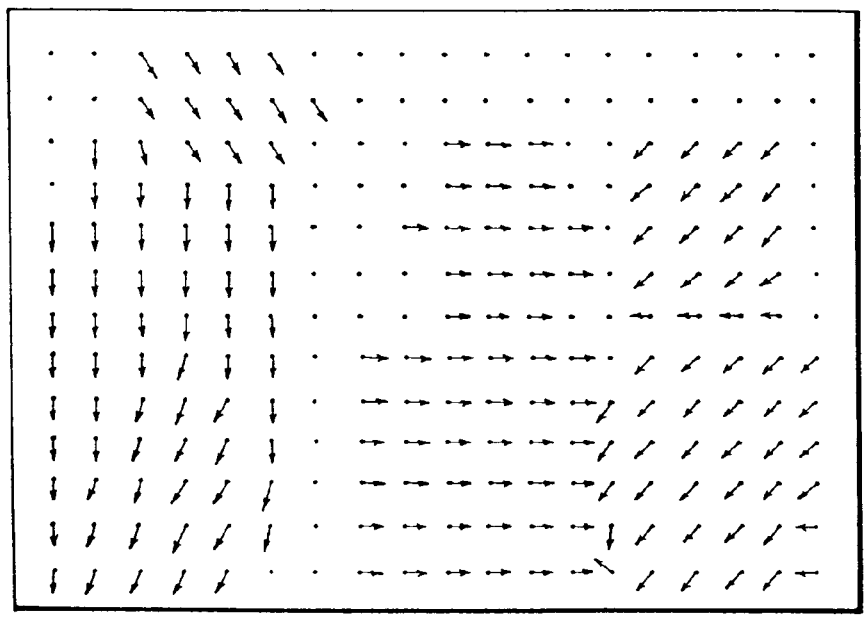
Figure 21C:
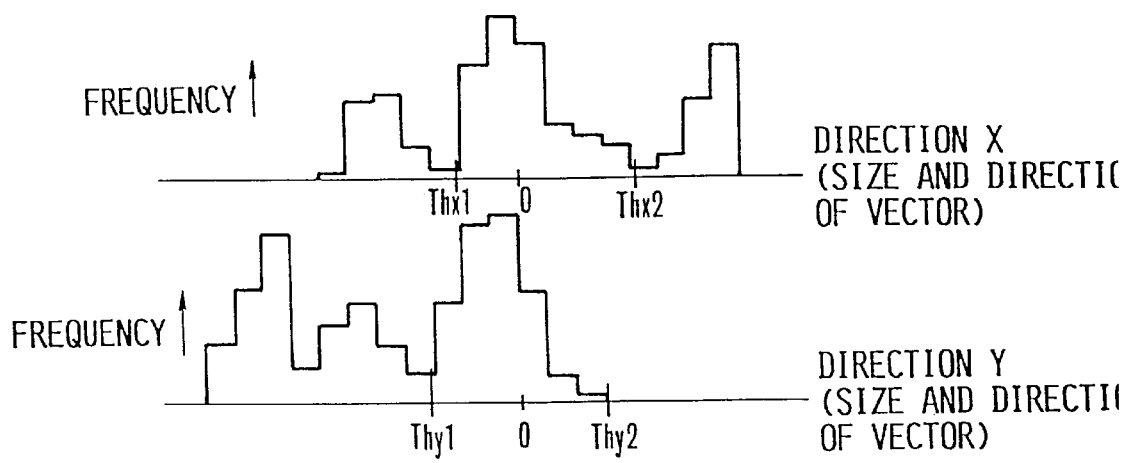
Figure 21D:
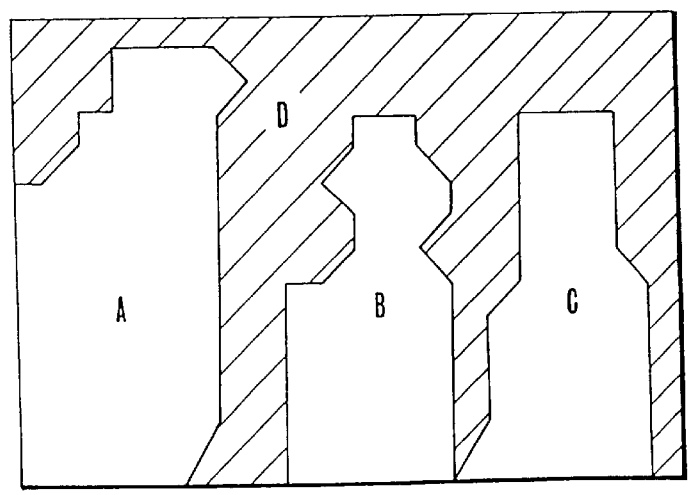

The movement vector detecting circuit 330 obtains the movement vectors for every block by a method called a time-space gradient method. This method is discussed by B. K. P. Horn, et al. in "Artificial Intelligence", 17, p 185–203 (1981). It permits real time processing by a special purpose hardware. The movement vector obtained by this method for the whole image plane showing any movement taking place at every one of the blocks is called an optical flow. The actions of the circuit elements 330 to 338 are described with reference to FIGS. 21(a) to 21(d) as follows: FIG. 21(a) shows by way of example the image plane of a currently photographed field. FIG. 21(b) shows an optical flow obtained by accumulating for a given period of time a difference between the current field and an immediately preceding field. FIG. 21(c) shows histograms representing the optical flow in sizes obtained in the directions x and Y respectively. FIG. 21(d) shows the sections of areas recognized by this embodiment.

In this instance, a motion picture of a moving object is taken. As a result of the intention of the photographer to prevent the camera from moving, the movement of the background is less than that of the object. The movement vectors detected by the movement vector detecting circuit 330 are accumulated for a given period (one sec, for example) by the memory 332. After that, the accumulated vectors are supplied to the statistical processing circuit 334. The statistical processing circuit 334 prepares the histograms as shown in FIG. 21(c) by ranking these vectors according to the sizes of the X and Y components of each vector. In FIG. 21(c), the upper half of the drawing shows the vector histogram for the direction X and the lower half the vector histogram for the other direction Y. In these histograms, each of axes in the directions X and Y indicates positive and negative sizes, which are separated by an origin O set, for example, in the center of the image plane. The frequency values of the vectors are indicated in the vertical direction of the drawing. The threshold determining circuit 336 determines threshold values from the shape of these two histograms. In each of the directions X and Y, a very small value near a distribution part having a peak value closest to zero in each of the directions X and Y is found and the position of this value is determined to be the threshold value. Threshold values are obtained in this manner on both the positive and negative sides. In FIG. 21(c), reference symbols Thx1, Thx2, Thy1 and Thy2 respectively denote these threshold values.

The threshold values thus determined are supplied to the area determining circuit 338. The area determining circuit 338 looks up the blocks which are within the range of the threshold values among the movement vectors stored in the memory 332. For example, assuming that a block located in the i-th place in the direction of m and in the j-th place in the direction of n is expressed as a block Bij and that, within the block Bij, the moving quantity in the direction X is expressed as Uij and the moving quantity in the direction Y as Vij, the circuit 338 sets the following conditions:

Thx1<Uij<Thx2, and

Thy1<Vij<Thy2

Blocks satisfying these conditions are assumed to be "on" while the rest to be "off". Then a relation between "on" and "off" blocks becomes as shown in FIG. 21(d). In FIG. 21(d), a hatched part indicates the area of "on" blocks, which approximately coincide with the background area shown in FIG. 21(a).

The image shake quantity detecting circuit 340 computes and obtains a moving quantity from within the "on" area. The detecting method to be employed by the image shake quantity detecting circuit 340 is not limited to the representing point matching method. The movement can be detected at a high speed by image processing. The method may be replaced with any method that permits control over execution ("on") and non-execution ("off") of computation of correlation for every one of blocks. The quantity of shake obtained by the image shake quantity detecting circuit 340 is supplied to the driving control circuit 344. The actuator 342 then drives the variable verticl-angle prism 312 in such a way as to lessen the output (quantity of shake) of the image shake quantity detecting circuit 340, i.e. to lessen the movement of the image plane due to shake of the camera.

The movement vector detecting circuit 330 and the image shake quantity detecting circuit 340 are preferably arranged to perform a computing operation for every field. However, the processing operation of the circuit elements 332 to 338 may be performed once in several hundred msec to several sec, because: The camera shake frequency is generally within a range from 1 to 3 Hz and the frequency of mechanical vibrations of vehicles or the like higher than that. Therefore, any inadvertent object tracing action can be prevented by setting the cycle of the statistical computation of these circuit elements at a value longer than these periods.

Further, in the foregoing description, the histograms have been described as to be prepared both in the directions X and Y. However, this may be changed to prepare a histogram for a two-dimensional space X-Y. In a case where the optical flow is obtained by using images accumulated for a given period of time by the movement vector detecting circuit 330, the computing cycle of the circuit elements 332 to 338 must be changed accordingly.

Figure 22A:
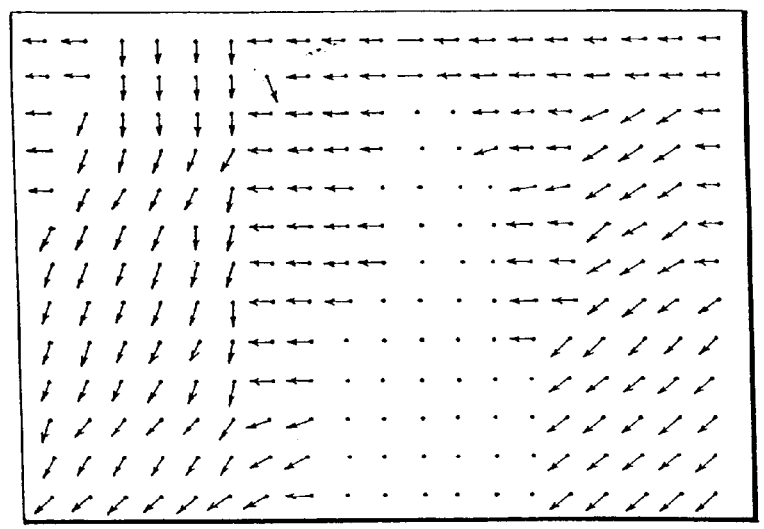
Figure 22B:
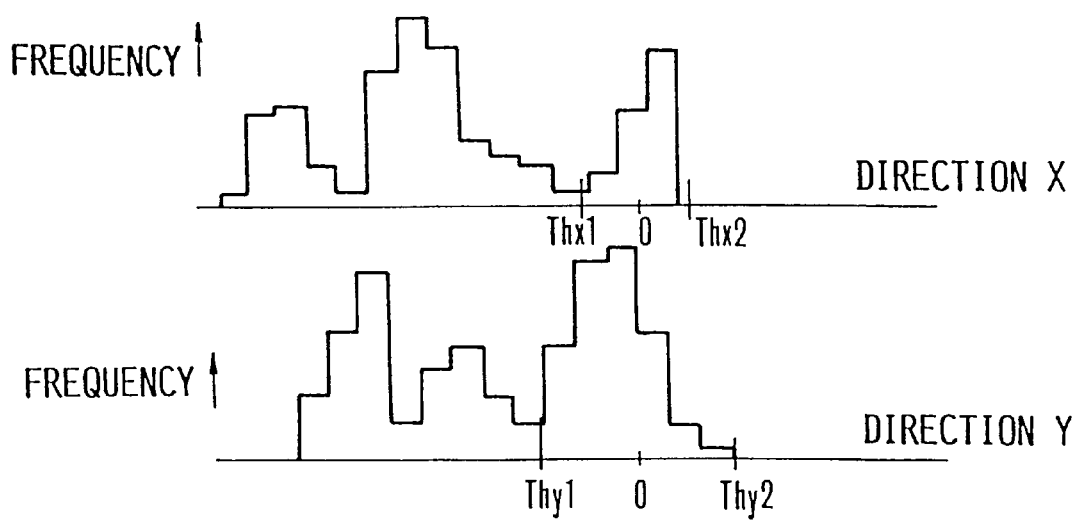
Figure 22C:
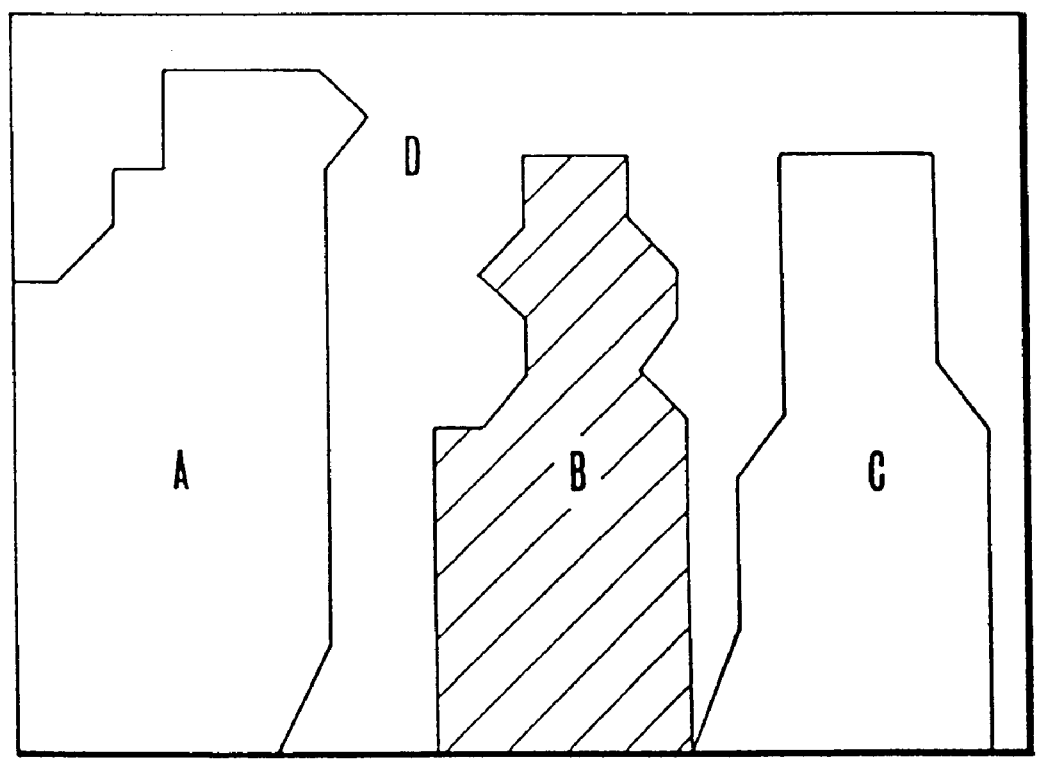

Next, in cases where the photographer wishes to perform panning by tracing (tracking) an object, the embodiment operates as follows: Let us assume that a person B which is located in the central part of an image plane as shown in FIG. 21(a) is to be traced. In this instance, the optical flow becomes as shown in FIG. 22(a). Thus, the photographer tries to have the person B always in a given position within the image plane. As a result, the movement vectors become small at the image of the person B. Meanwhile, the movement vectors in the rest of the image plane including the background become large. FIG. 22(b) shows histograms similar to those of FIG. 21(c). FIG. 22(c) shows an "on" area (hatched part) determined by the area determining circuit 338. The threshold values Thx1, Thx2, Thy1 and Thy2 and the areas are determined by the same process as mentioned in the foregoing.

In the case of the embodiment described above, if the movement or deformation of the object is periodically repeated and if the statistical histogram processing periods of the circuit elements 32 to 38 are coinciding, a dynamic area having a repeating motion cannot be distinguished from a static area. In that instance, the changing quantity (dispersion) of the vector is obtained for each block. Any area that has the changing quantity not greater than a predetermined value is determined to be a tracing area. For example, assuming that average vectors values in a processing period T of the statistical process for vectors Uijt and Vijt of a block Bij obtained at a time point t are $\overline{Uij}$ and $\overline{Vij}$ and the dispersion degrees of the vectors are Sxij and Syij, the vector dispersion can be expressed as follows:

$$Sxij = \frac{1}{T-1} \sum_{t=1}^{T} (Uijt - \overline{Uij})^2$$

$$Syij = \frac{1}{T-1} \sum_{t=1}^{T} (Vijt - \overline{Vij})^2$$

The values Sxij and Syij of each block are compared with those of another. It is also possible to make this comparison in the square roots (standard deviations) of the values Sxij and Syij.

As described in the foregoing, in accordance with this invention, the object tracing area is determined by statistically processing the optical flow. Therefore, the embodiment is capable of automatically discriminating an object which is desired to be stably positioned within the image plane from other objects, even if these objects are hardly distinguishable by luminance from each other or even if there are plurality of moving objects within the image plane. The invented area determining method is not limited to a TV camera. It will find a widely ranged applications including an industrial TV camera and a monitoring camera. The embodiment of this invention has salient advantages for practical applications.

FIGS. 23 to 26 show a ninth embodiment of the invention. In this case, an image movement detecting device which utilizes the optical flow of the movement vectors mentioned in the foregoing is applied to an automatic focusing device. The background of the ninth embodiment is first described as follows:

The video camera has recently come to use an automatic focusing device which uses the video signal of the camera and is capable of detecting an in-focus state by using information on the image obtained within an image plane irrespectively of distance to the object to be photographed. Therefore, the automatic focusing device of this kind has become popular in place of the focus detecting method of performing focus detection by projecting infrared rays or ultrasonic waves and detecting the reflection waves of them.

The focus detection method of the kind using the video signal can be roughly divided into two methods.

In one of the two methods, the video signal is modulated by forcedly bringing about an out-of-focus state by slightly vibrating either a component lens member of a photo-taking optical system or an image sensor in the direction of the optical axis with an actuator such as a bimorph element, a voice coil or the like (hereinafter this will be called a modulation method).

In the other method, the photo-taking optical system is driven in such a way as to cause, for example, a high-frequency component of the video signal to be at a a maximum value (hereinafter called a trial method).

In accordance with the modulation method, an in-focus degree little varies and the modulated signal remains almost at zero after an in-focus state is attained even when the photo-taking optical system is vibrated. In the event of an out-of-focus state, a modulated signal is generated. Then, the phase of the modulated signal relative to the modulating signal is inverted according to whether it is in a near focus state or in a far focus state. Therefore, the focus adjusting actuator (which is a DC motor in general) is restarted according to the presence or absence of this modulated signal. The restarting direction is determined according to the phase of the modulated signal. This enables the actuator to be accurately restarted. However, the modulation method necessitates the modulating actuator to be of a high degree of precision and to be capable of performing a highly accurate action. Therefore, the structural arrangement of the camera becomes complex and large. As a result, it not only requires complex adjustment but also is disadvantageous in terms of electric energy consumption.

In the case of the trial method, the lens or the image sensor is moved in such a way as to bring a signal component corresponding to a focusing degree to its maximum value. After attainment of an in-focus state, a focus signal obtained then is stored. After that, a current focus signal is compared with the stored signal. When the result of comparison indicates occurrence of any change, the focus adjusting actuator is restarted. This method does not require any complex driving system for focus adjustment to permit simplification and reduction in size of the camera. A drawback of the trial method, however, resides in that: In restarting the actuator after it has been brought to a stop with an in-focus state attained, information on the direction in which the lens or the image sensor is to be driven is often unobtainable. This necessitates trial shifting of the lens in one direction or the other. If the focus signal increases in the direction thus indicating that the lens position is approaching to an in-focus point, the actuator is allowed to drive the lens further. However, if the focus signal decreases thus indicating that the lens is being shifted in the wrong direction, the driving direction of the actuator is reversed. Since this method theoretically necessitates such a trial action, it does not ensure a stable automatic focusing operation.

In the case of the ninth embodiment, the invented shake detecting method of using the optical flow of movement vectors is applied to the simple arrangement of the above-stated trial method in such a way as to make available the information on the lens driving direction. The automatic focusing device which is arranged as the ninth embodiment comprises: focus detecting means which is arranged to perform focus adjustment by detecting a focusing degree on an object appearing within the image plane; movement vector detecting means for obtaining the movement vectors of an image in each of a plurality of divided areas of the image plane; and control means arranged to compute the moving degree of the image on the basis of movement vector information output from the movement vector detecting means and to actuate the focus detecting means when the moving degree comes outside of a predetermined range.

With the direction in which the the object and the camera move relative to each other thus detected from the information on the image movement vectors, the automatic focusing device can be restarted according to the information. Unlike the modulation method which requires a complex and high precision mechanism including the modulating actuator, etc., the embodiment is capable of stably, promptly and highly accurately carrying out an automatic focusing action with a simple structural arrangement which is fundamentally based on the trial method.

In FIGS. 23 to 26, the component parts which are either the same or are arranged to perform the same actions as the corresponding parts of FIGS. 20 to 22(c) are indicated by the same reference numerals and symbols and the details of them which have already been described are omitted from the following description.

Figure 23:
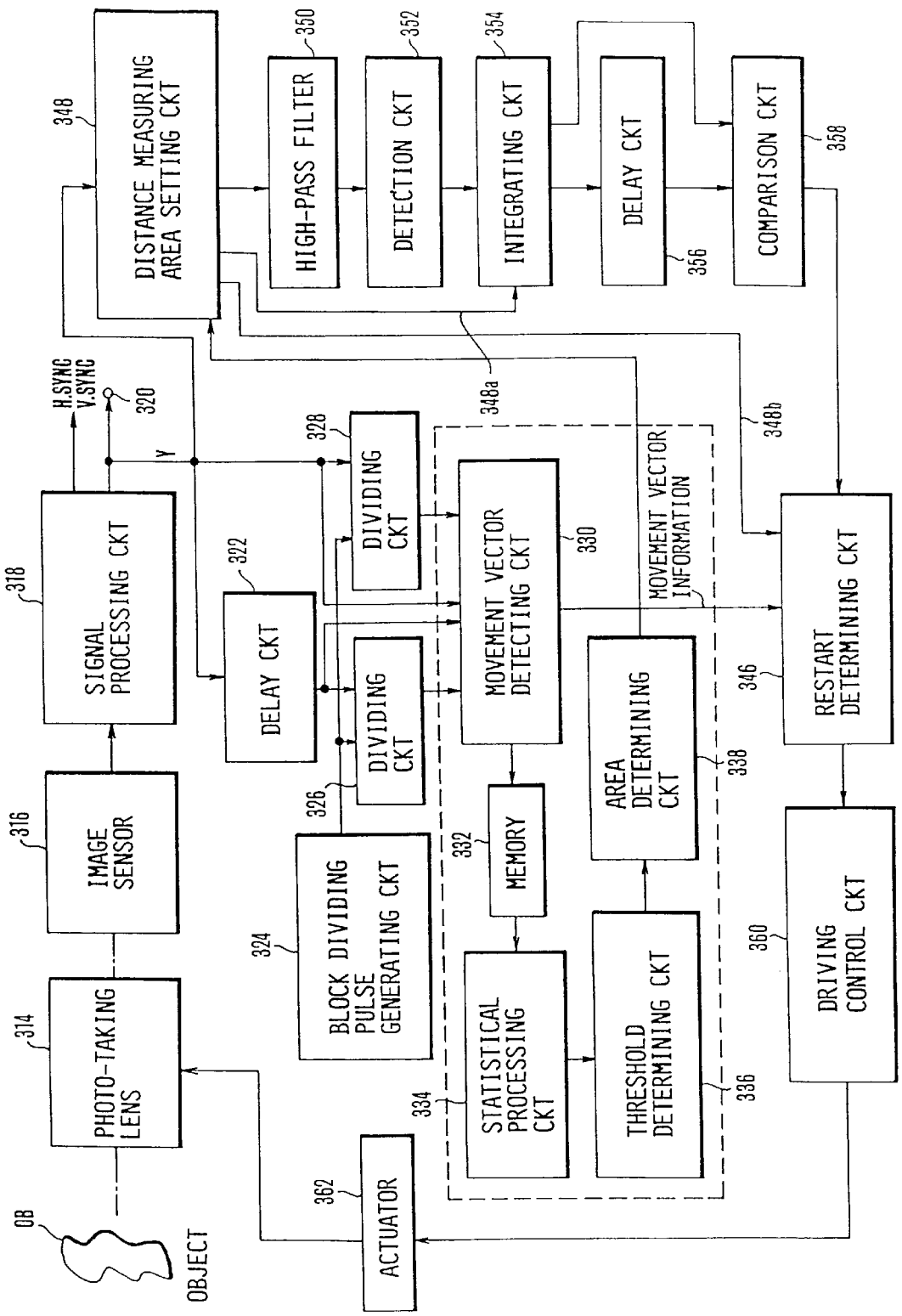
FIG. 23 is a block diagram showing an automatic focusing device which is arranged according to this invention as a ninth embodiment thereof.

FIG. 23 is a block diagram, which differs from the arrangement of FIG. 20 in the following points: The variable apex-angle prism 312, the prism driving actuator 342 and the driving control circuit 344 are excluded. Arranged in place of them are a focus adjusting actuator 362 for focus adjustment of the photo-taking lens 314 and a driving control circuit 360 which controls the actuator 362. There are also provided automatic focus detection blocks 348 to 358 which are arranged to detect a movement of the object on the basis of movement vector information obtained from the movement vector detecting circuit 330. A restart determining circuit 346 is provided for restarting the automatic focusing device.

Referring to FIG. 23, the restart determining circuit 346 is arranged to receive the output of the movement vector detecting circuit 330, the outputs of a distance measuring area setting circuit 348 and the output of a comparison circuit 358 and to determine according to these outputs whether the automatic focusing device is to be restarted.

Next, an automatic focus adjusting system is arranged as follows: The distance measuring area setting circuit 348 is composed of a gate circuit which is arranged to cause only a luminance signal which is included in a luminance signal Y output from the signal processing circuit 318 and which corresponds to a focus detection area (distance measuring area) set on the image sensing plane to pass. The circuit 348 sets the distance measuring area on the image sensing plane on the basis of the output of the area determining circuit 338. A high-pass filter 350 is arranged to extract a high-frequency component from the luminance signal which corresponds to the distance measuring area set by the distance measuring area setting circuit 348. A detection circuit 352 is arranged to convert into a DC level signal the high-frequency component extracted by the high-pass filter 350. An integrating circuit 354 is arranged to integrate for a given period the DC level signal output from the detection circuit 352. Further, the integrating circuit 354 is arranged to have its integrating sensitivity controlled by a control signal 348a output from the distance measuring area setting circuit 348 accordingly as the distance measuring area changes, so that area correction is performed. A delay circuit 356 is arranged to delay the output signal (hereinafter referred to as a focus signal) of the integrating circuit 354 for a predetermined period of time which, for example, corresponds to one field. The comparison circuit 358 is arranged to compare a currently obtained focus signal with a focus signal obtained one field period before and delayed by the delay circuit 356. A driving control circuit 360 is arranged to drive and control an actuator (a DC servo motor, for example) which is arranged to control the focusing state of the photo-taking lens 314.

The automatic focusing device which is arranged according to this invention as described above operates in the following manner:

As mentioned in the foregoing, the area determining circuit 338 is arranged to produce information on the patterns of the object parts A, B and C and the pattern of the background area D, as shown in FIG. 21(d). The distance measuring area setting circuit 348 performs a gating action on the basis of this information in such a way as to cause only the luminance signal of a main object part to pass and supplies it to a high-pass filter 358. In other words, an area where the main object is located is thus set as the distance measuring area. At the high-pass filter 358, the high-frequency component is extracted from the luminance signal supplied there. The extracted high-frequency component is converted into a DC level signal by the detection circuit 352 and is integrated for a predetermined period of time by the integrating circuit 354. The integrating circuit then produces a focus signal. The focus signal is supplied to the comparison circuit 358 along with a focus signal which relates to a previous image plane obtained one field period before and which has been delayed for one field period by the delay circuit 356. These focus signals of the current image plane and the previous image plane are compared with each other by the comparison circuit 358. The result of comparison is supplied via the restart determining circuit 346 to the driving control control circuit 360. The driving control circuit 360 then controls and causes the actuator 362 to drive the photo-taking lens 314 in the direction of increasing the level of the focus signal. When the focus signal level reaches a maximum value and then decreases, the position of the lens obtained when the the focus signal level has reached the maximum value is determined to be an in-focus position. The photo-taking lens 314 is brought back to that position and the automatic focusing action comes to an end.

When the integration outputs of the integrating circuit 354 are compared by the comparison circuit 358 during the process of the automatic focusing action, if the size of the distance measuring area previously set one field period before is found to differ from that of the distance measuring area of the current field, the integration signals differ in level although the focused state remains unchanged. In such a case, the difference in level might cause erroneous determination as the result of level comparison does not correspond to the focused degree. To solve this problem, a control signal 348a which represents the size of the distance measuring area is supplied to the integrating circuit 354. Any area difference between the distance measuring areas of the two field image planes is compensated for by virtue of this control signal. In other words, the integration signal output level of the integrating circuit 354 is normalized by the area value of the distance measuring area. In the case of this embodiment, the above-stated compensation is accomplished by changing the integrating sensitivity of the integrating circuit 354 from one value over to another.

The practical arrangement of the distance measuring area setting means is as described above. In the statistical processing operation which is performed jointly by the memory 332, the statistical processing circuit 334, the threshold determining circuit 336 as described in the foregoing, the histograms are prepared both for the directions X and Y of the image sensing plane. However, this may be changed to prepare a histogram for an X-Y two-dimensional space. Further, in a case where the optical flow is obtained at the movement vector detecting circuit 330 by using an image accumulated for a given period of time, the operation cycle of the group of circuit elements from the memory 332 to the area determining circuit 338 must be changed according to the image accumulating period of time.

As described in the foregoing, the distance measuring area is set according to the output of the area determining circuit 338. However, for ordinary photographing, a main object is located in the central part of the image plane. In addition to this, it is desirable to avoid a distance measurement confusion between the main object and the background. Therefore, an area in and around the central part of the image plane alone may be selected as the distance measuring area. In that case, the areas A and C can be completely disregarded. It is also possible to set a window function in such a way as to have the central part of the image plane weighted 100% and the four diagonal corners 0% with the weight of the area between these parts arranged to continuously vary.

Figure 24:
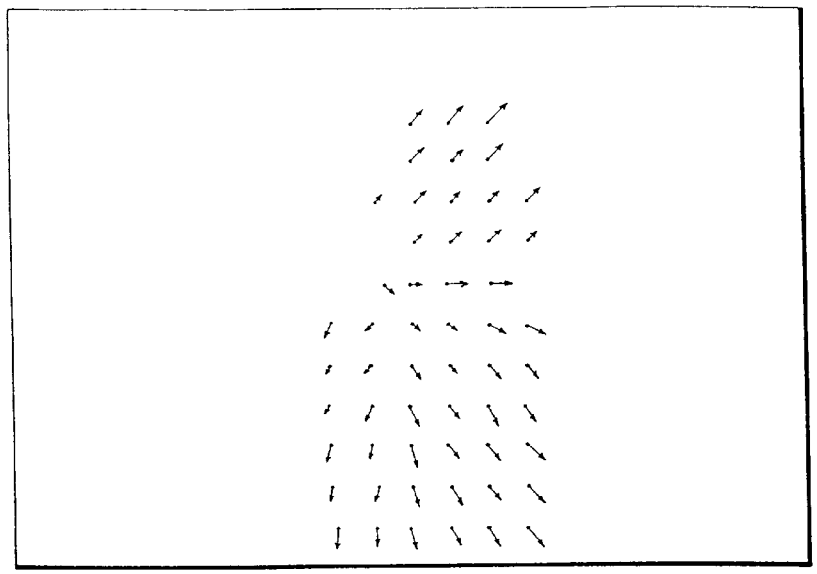
FIG. 24 is an illustration of an operation performed to determine a distance measuring area according to an optical flow.

The restart of the automatic focusing device on the basis of the movement vectors is actually determined in the following manner: For the sake of simplification of illustration, the distance measuring area is assumed to be set in the central part of the image plane and around it, for example, as represented by the area B in FIG. 21(d). FIG. 24 shows an optical flow obtained in the area B under this condition. In the case of this optical flow, the object corresponding to the area B is moving a little toward the upper right-hand side of the image plane while approaching to the camera. The movement vectors in the divided blocks are as a whole trending to the right having the directions and sizes divergent toward the peripheral area. This indicates that the object is approaching the camera and, at the same time, is moving to the right-hand side thereof.

Figure 25:
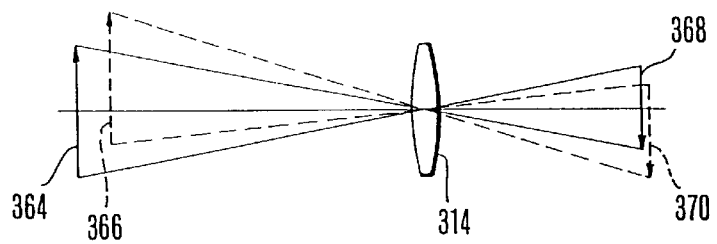
FIG. 25 is an illustration of the nature of the optical flow.

FIG. 25 shows the nature of an optical flow of this type. Referring to FIG. 25, a photo-taking lens 314 is identical with the photo-taking lens 314 of FIG. 23. A reference numeral 364 denotes the object which corresponds to the area B of FIG. 21(d). A numeral 368 denotes an image formed on the image sensing plane representing the object. A numeral 366 denotes a state of the object obtained when it moves upward as viewed on FIG. 24 while it is approaching the photo-taking lens 314. A numeral 370 denotes the image of the moved object. The vectorial size of the optical flow which represents the upward movement as viewed on the drawing is unvarying irrespectively of their positions within the image plane. Whereas, the optical flow resulting from the approach of the object to the lens is brought about by the expansion of the object's image and the vectorial size thereof changes accordingly as its position varies within the image plane. The size of the vector is zero on the optical axis of the photo-taking lens 314, i.e. in the center of the image plane and increases accordingly as its distance from the central part of the image plane increases. The optical flow of FIG. 24 is a composite optical flow consisting of the vectors resulting from these two different factors. Further, while the images 368 and 370 on the image sensing plane are illustrated as in different positions on the optical axis, they are in actuality formed on one and the same plane.

Figure 26:
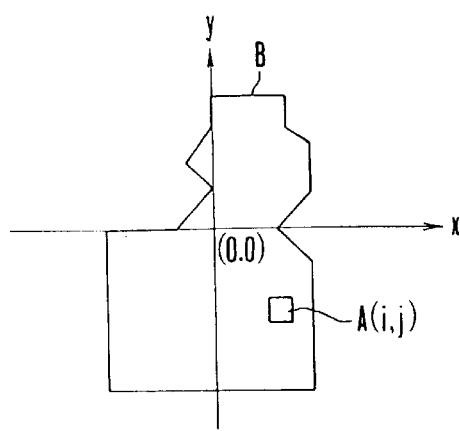
FIG. 26 is an illustration of an operation performed to decide a restart by detecting a movement of an object within the distance measuring area.

Next, a computing operation which is performed within the restart determining circuit 346 is described as follows: FIG. 26 is a graphical representation of the area B of FIG. 21(d). Coordinates x and y are obtained with the center of the image plane set as an origin (O,O). The coordinates of blocks within the distance measuring area B are assumed to be (i,j). The vector of the optical flow in each block is assumed to be A(i,j). Further, the unit vector in the x direction is assumed to be "i" and the unit vector in the y direction to be "y". The optical flow vector can be rewritten as A(i,j)=iAx+jAy.

The displacement of the optical flow vector due to the expansion or contraction of the image means the divergence of vectors on the image plane. The divergence "divA" of the vector A can be expressed as follow:

$$divA = \frac{\partial Ax}{\partial x} + \frac{\partial Ay}{\partial y}$$

This divergence represents a change in distance between the object and the camera.

The restart determining circuit 346 obtains control information on the distance measuring area from the distance measuring area setting circuit 348 and also obtains information on movement vectors of each block of the image sensing plane from the movement vector detecting circuit 330. The restart determining circuit 346 then computes and obtains the sum of "divA" as follows:

$$d = \sum_B divA$$

The sum of the divergence "divA" within the area B changes according to the expansion or contraction of the object's image on the image sensing plane.

In the case of FIG. 24, the sum "d" becomes larger than zero as the image has expanded. If the object has moved away from the photo-taking lens 314, the sum becomes smaller than zero.

Therefore, if a state of "d=0" continues after attainment of an in-focus state, the distance to the object remains unchanged and the lens is left in repose. In a case where the sum "d" is not equal to 0 after attainment of the in-focus state, the distance between the camera and the object is regarded as changed and the automatic focusing device is restarted. In that case, the focus adjusting direction can be determined by the positive or negative value of the sum "d". More specifically, the object can be considered to have come closer to the photo-taking lens 314 if the sum "d" is larger than zero. In this instance, the focal point of the photo-taking lens 314 is in the rear of the object and there obtains image the so-called far-focus state. If the sum "d" is less than zero, the object has moved farther away from the lens. In that instance, there obtains a near-focus state of the lens.

With the divergence "divA" of the optical flow vector within the distance measuring area examined in this manner, any change occurred in the object distance and the direction of the change can be accurately detected. This enables the automatic focusing device to be restarted as necessary after attainment of an in-focus state. Even in a case where the trial method is employed for the automatic focusing device, information on a near-focus or far-focus state can be accurately obtained without carrying out any trial action. The arrangement of this embodiment thus enables the automatic focusing device to be promptly, stably and accurately restarted.

Further, in accordance with the invention, a change in the object distance can be reliably detected by carrying out the statistical process on the movement vectors to compute the divergence of the optical flow vectors even in the event of a plurality of objects within the image sensing plane, a complex background or a hardly extractable image feature because of a slight difference in luminance, etc. The sensitivity and accuracy of the. embodiment are thus arranged to be much higher than those of the conventional device.

In accordance with the arrangement of the embodiment of this invention as mentioned in the foregoing, the optical flow of the image plane is obtained by detecting the movement vectors for each of the plurality of blocks on the image sensing plane; the occurrence or nonoccurrence of any movement of the object is detected from the displacement of the optical flow; a discrimination is accurately made between an approaching movement and a parting movement; and the necessity for restart of an automatic focus adjusting action is determined on the basis of the information thus obtained. Therefore, unlike the conventional modulation method, the embodiment obviates the necessity of having recourse to a highly precise and complex mechanism for positively modulating the focus signal by creating an in-focus or out-of-focus state in obtaining information on a near-focus or far-focus state. The automatic focusing device according to this invention is thus arranged to be capable of accurately and precisely determining the necessity for a restart of the focus adjusting action from the image signal through an efficient and stable operation.

What is claimed is:

1. An object recognition device comprising:
    a) movement vector detecting means for detecting movement vectors of an image in each of detection blocks formed by dividing an image frame;
    b) computing means for detecting a distributed state of the movement vectors in said image frame; and
    c) object recognizing means for recognizing an existence and shape of an object being located in said image plane on the basis of an output of said computing means.

2. A device according to claim 1, wherein said movement vector detecting means is arranged to obtain said movement vector in each of said detection blocks on the basis of a luminance variation in each of said detection blocks on said image plane.

3. A device according to claim 2, wherein said object recognizing means is arranged to obtain an outline of said object on the basis of the distribution of movement vectors.

4. A device according to claim 3, wherein said object recognizing means discriminates each of objects in said image plane on the basis of a groups of the movement vectors having substantially same movement direction.

5. A device according to claim 4, wherein said objects include a main object and a background of said main object.

6. A device according to claim 1, further comprising movement detecting means for detecting movement value of said object on the basis of the movement vectors.

7. An object recognition device comprising:
   a) movement vector detecting means for detecting a movement vector of an object image located in an image plane;
   b) computing means for detecting a distributed state of movement vectors in each of objects in said image plane; and
   c) recognizing means for recognizing a location and shape of said each of objects on the basis of an output of said computing means.

8. A device according to claim 7, wherein said movement vector detecting means is arranged to obtain said movement vector in each of detection blocks on the basis of a luminance variation in each of said detection blocks on said image plane.

9. A device according to claim 8, wherein said objects including a main object and a background of said main object.

10. A device according to claim 9, further comprising movement detecting means for detecting movement value of said object on the basis of the movement vectors.

11. An object recognition method comprising:
   a) movement vector detecting step of detecting movement vectors of an image in each of detection blocks formed by dividing an image frame;
   b) computing step of detecting a distributed state of the movement vectors in said image frame; and
   c) object recognizing step of recognizing an existence and shape of an object being located in said image plane on the basis of an output of said computing step.

12. A device according to claim 11, wherein said movement vector detecting step is arranged to obtain said movement vector in each of said detection blocks on the basis of a luminance variation in each of said detection blocks on said image plane.

13. A method according to claim 12, wherein said object recognizing step obtains an outline of said object on the basis of the distribution of movement vectors.

14. A method according to claim 13, wherein said object recognizing step discriminates each of objects in said image plane on the basis of a groups of the movement vectors having substantially same movement direction.

15. A method according to claim 14, wherein said objects include a main object and a background of said main object.

16. A method according to claim 11, further comprising movement detecting step of detecting movement value of said object on the basis of the movement vectors.

17. An object recognition method comprising:
   a) movement vector detecting step of detecting a movement vector of an object image located in an image plane;
   b) computing step of detecting a distributed state of movement vectors in each of objects in said image plane; and
   c) recognizing step of recognizing a location and shape of said each of objects on the basis of an output of said computing means.

18. A method according to claim 17, wherein said movement vector detecting step obtains said movement vector in each of detection blocks on the basis of a luminance variation in each of said detection blocks on said image plane.

19. A method according to claim 18, wherein said objects including a main object and a background of said main object.

20. A method according to claim 19, further comprising movement detecting means for detecting movement value of said object on the basis of the movement vectors.

* * * * *

UNITED STATES PATENT AND TRADEMARK OFFICE
CERTIFICATE OF CORRECTION

PATENT NO.   : 6,370,330 B2
DATED        : April 9, 2002
INVENTOR(S)  : Masayoshi Sekine et al.

It is certified that error appears in the above-identified patent and that said Letters Patent is hereby corrected as shown below:

Column 2,
Line 9, delete "operated-to" and insert -- operated to --.

Column 13,
Line 32, delete "t6" and insert -- to --.
Line 53, delete "F2-F1 $\leq$ 0," and insert -- F2-F1 $\geq$ 0, --.

Column 28,
Line 39, delete "tS" and insert -- t5 --.

Signed and Sealed this

Twenty-first Day of January, 2003

JAMES E. ROGAN
*Director of the United States Patent and Trademark Office*